Sept. 19, 1950  C. A. NICHOLS ET AL  2,523,137
PLASTIC MOLDING MACHINE
Filed Aug. 22, 1946  20 Sheets-Sheet 6

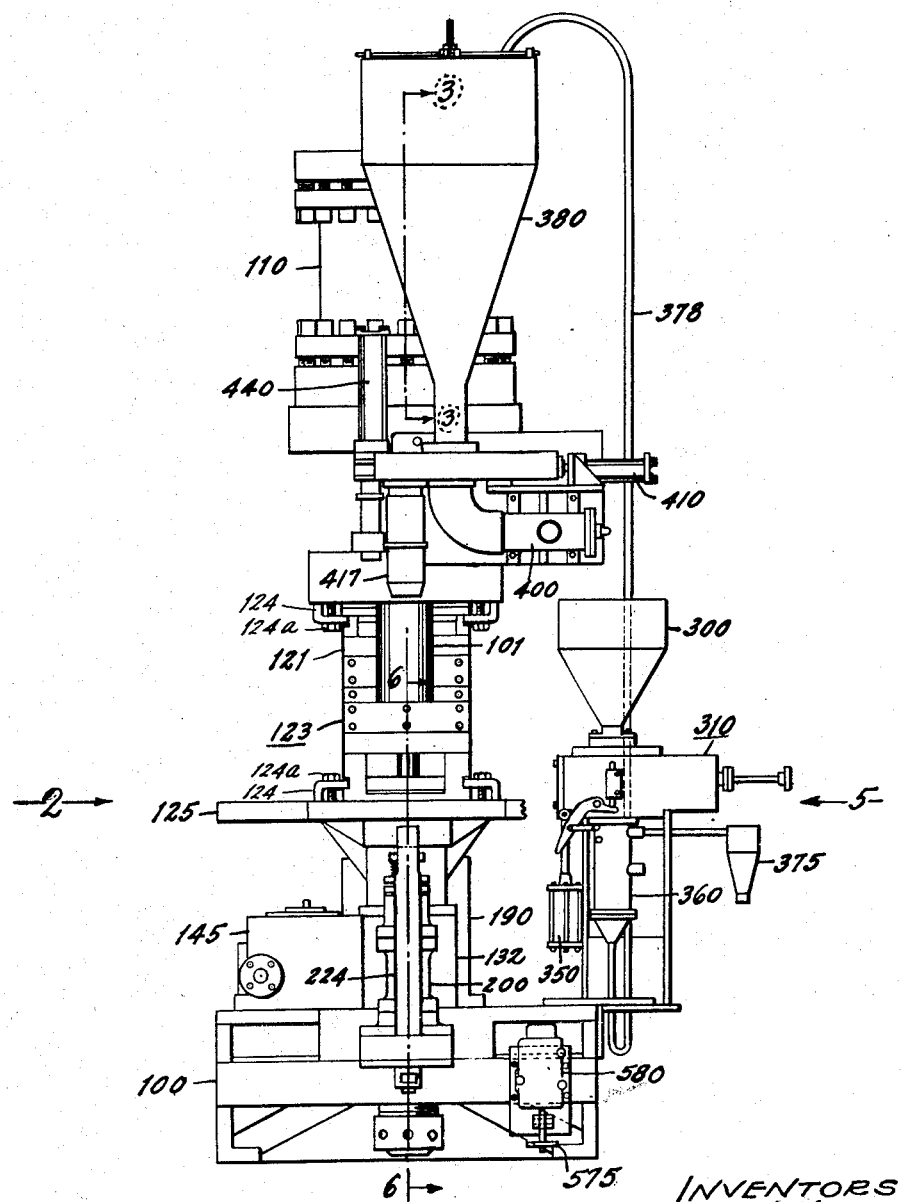

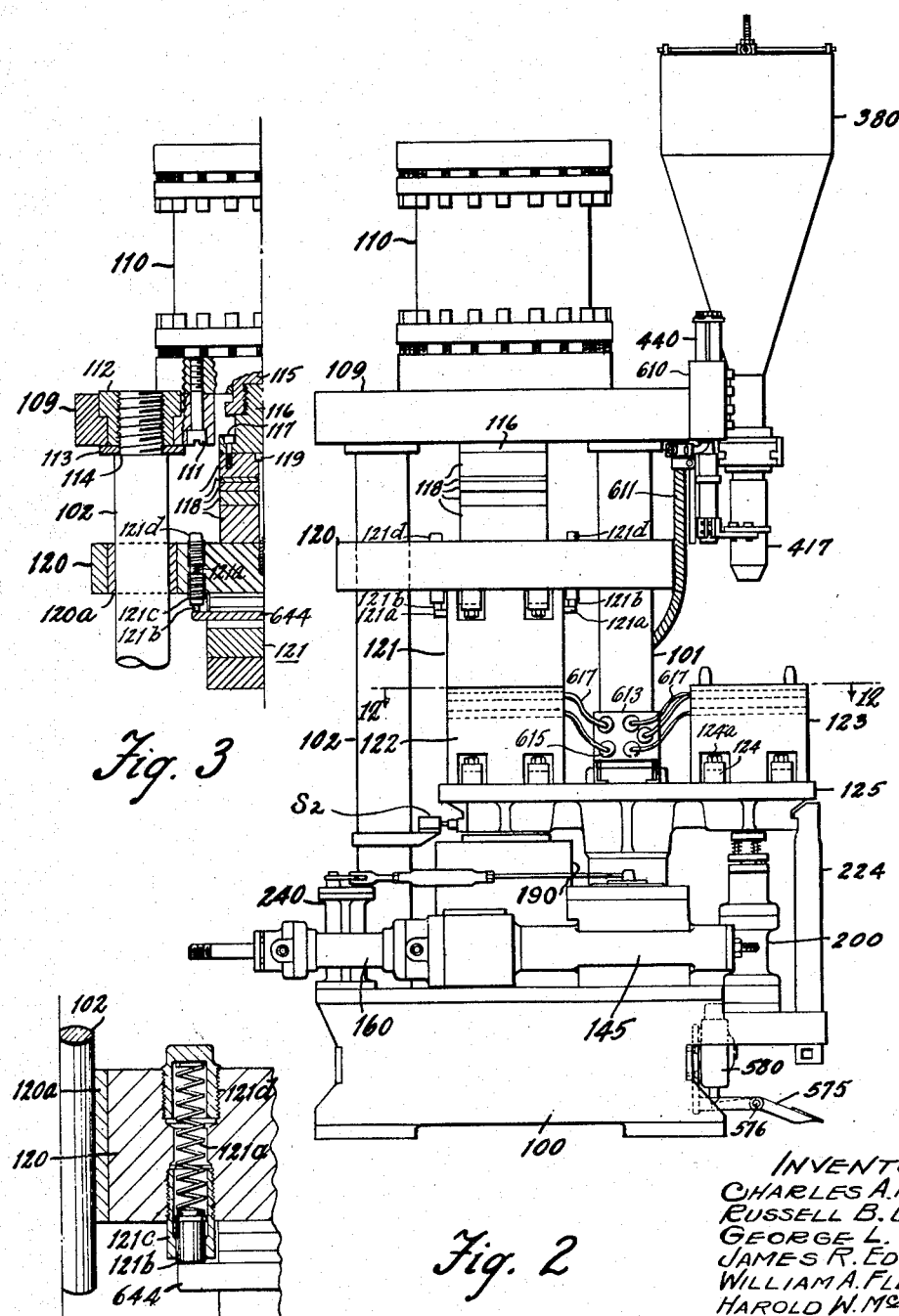

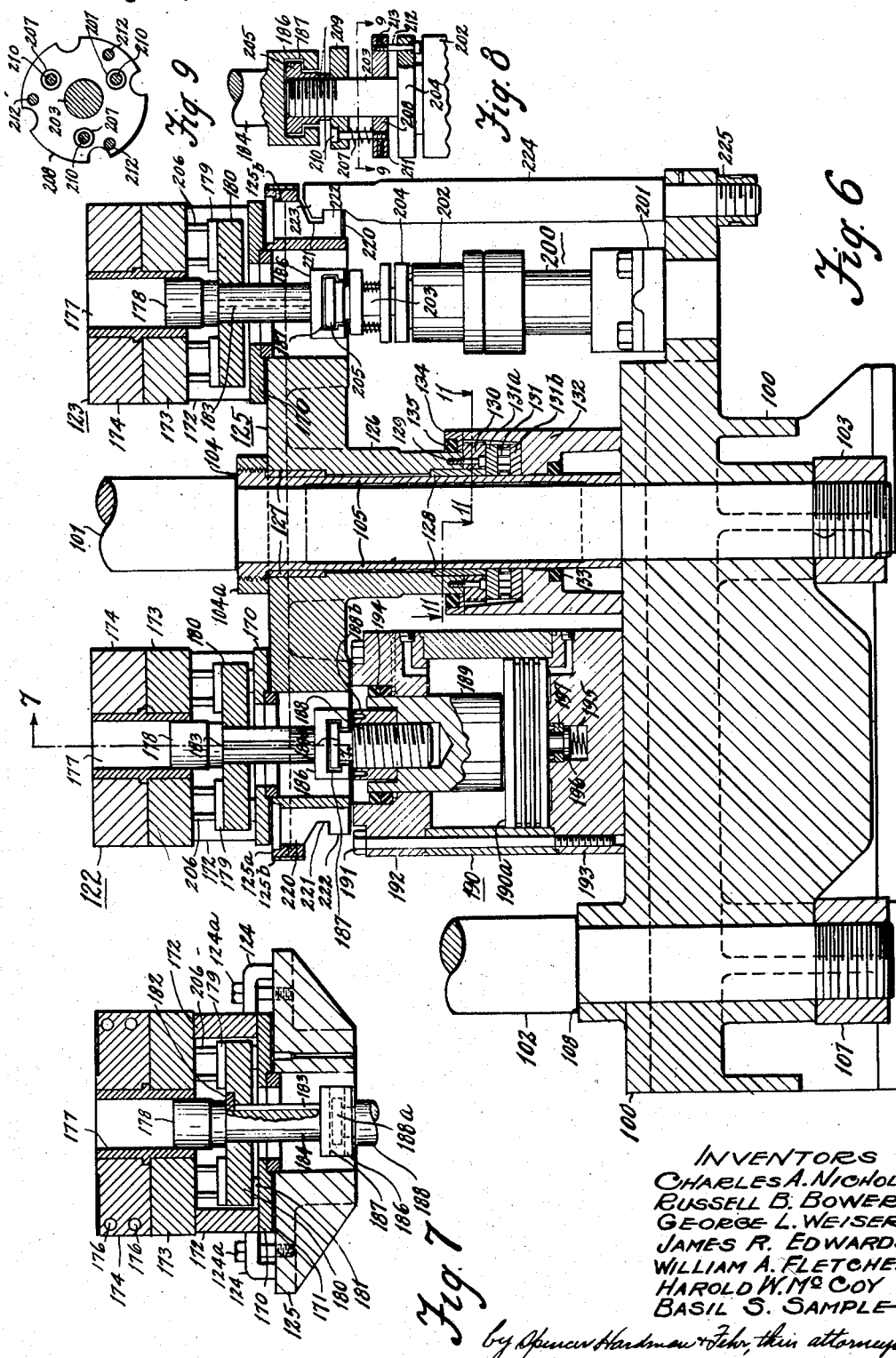

INVENTORS
CHARLES A. NICHOLS
RUSSELL B. BOWER
GEORGE L. WEIGER
JAMES R. EDWARDS
WILLIAM A. FLETCHER
HAROLD W. McCOY
BASIL S. SAMPLE
by Spencer Hardman & Fehr, their attorneys Sept. 19, 1950   C. A. NICHOLS ET AL   2,523,137
PLASTIC MOLDING MACHINE
Filed Aug. 22, 1946   20 Sheets-Sheet 7

INVENTORS
CHARLES A. NICHOLS
RUSSELL B. BOWER
GEORGE L. WEISER
JAMES R. EDWARDS
WILLIAM A. FLETCHER
HAROLD N. McCOY
BASIL S. SAMPLE
by Spencer Hardman & Fehr, their attorneys Sept. 19, 1950     C. A. NICHOLS ET AL     2,523,137
PLASTIC MOLDING MACHINE Filed Aug. 22, 1946                           20 Sheets—Sheet 8

INVENTORS
CHARLES A. NICHOLS
RUSSELL B. BOWER
JAMES R. EDWARDS
WILLIAM A. FLETCHER
HAROLD W. McCOY
BASIL S. SAMPLE
GEORGE L. WEISER

By Spencer Hardman & Fehr
their ATTORNEYS

Sept. 19, 1950  C. A. NICHOLS ET AL  2,523,137
PLASTIC MOLDING MACHINE
Filed Aug. 22, 1946  20 Sheets-Sheet 9

INVENTORS
JAMES R. EDWARDS
WILLIAM A. FLETCHER
HAROLD W. MCCOY
BASIL S. SAMPLE
CHARLES A. NICHOLS
RUSSELL B. BOWER
GEORGE L. WEISER
by Spencer Hardman & Fehr, their attorneys

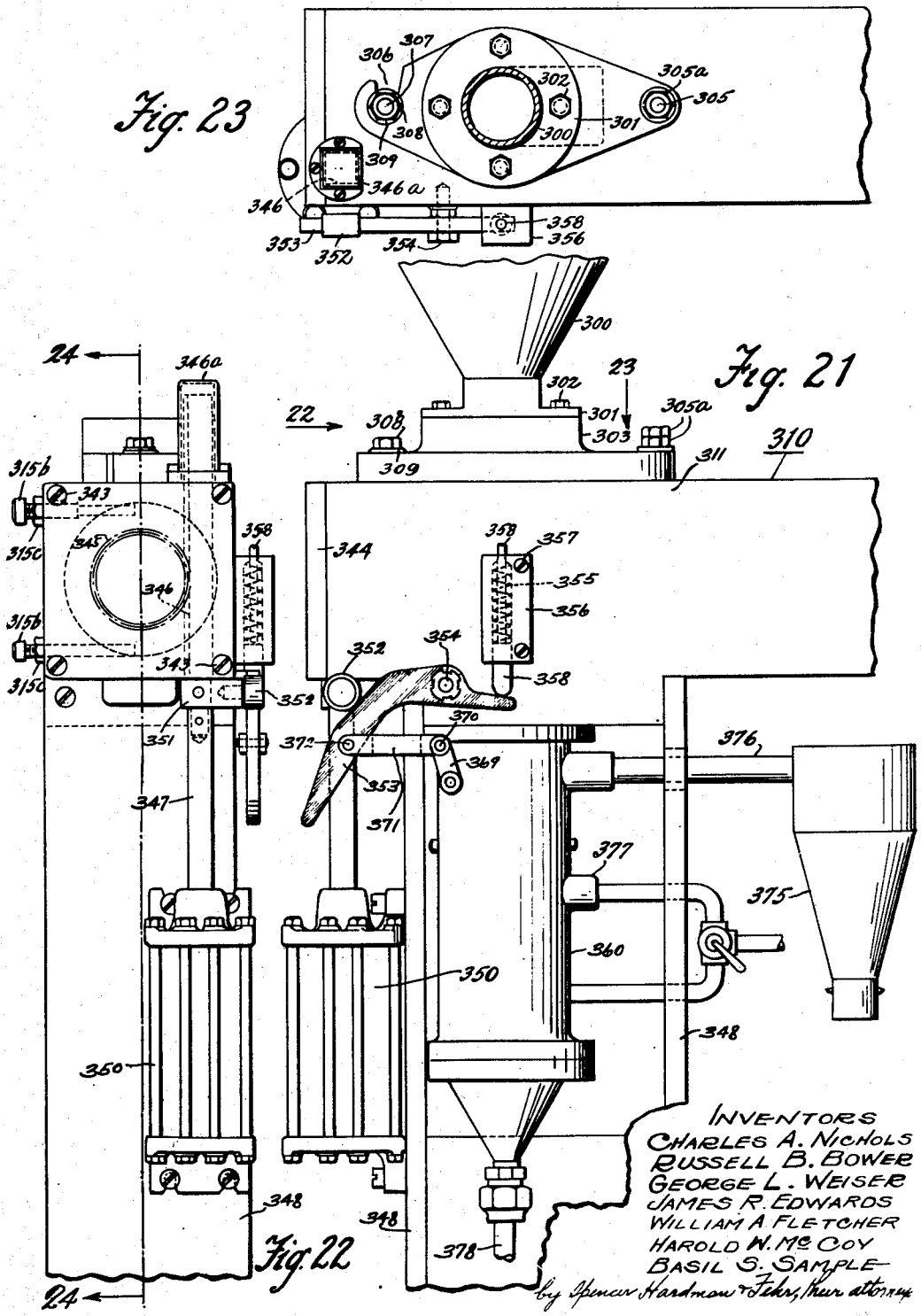

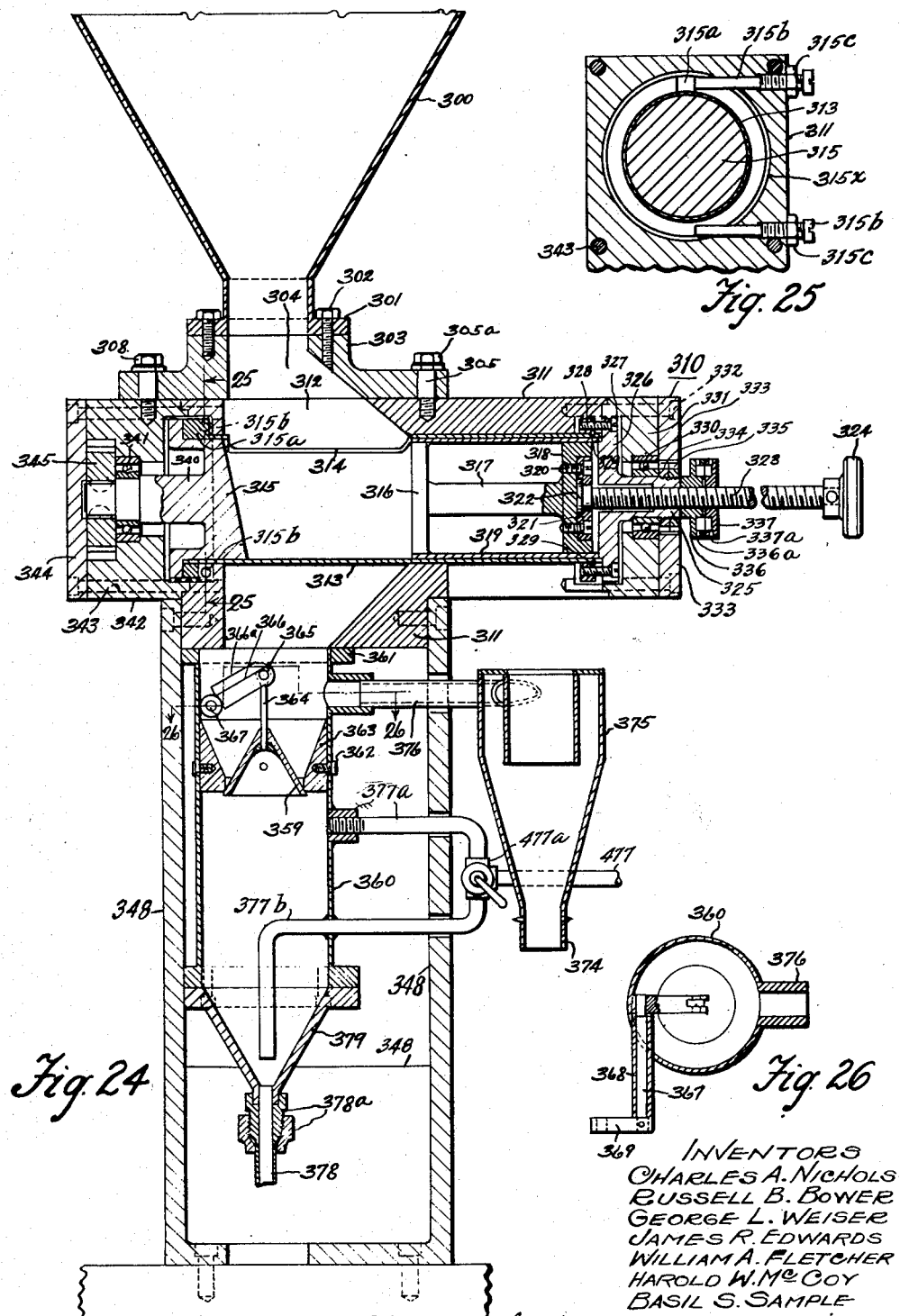

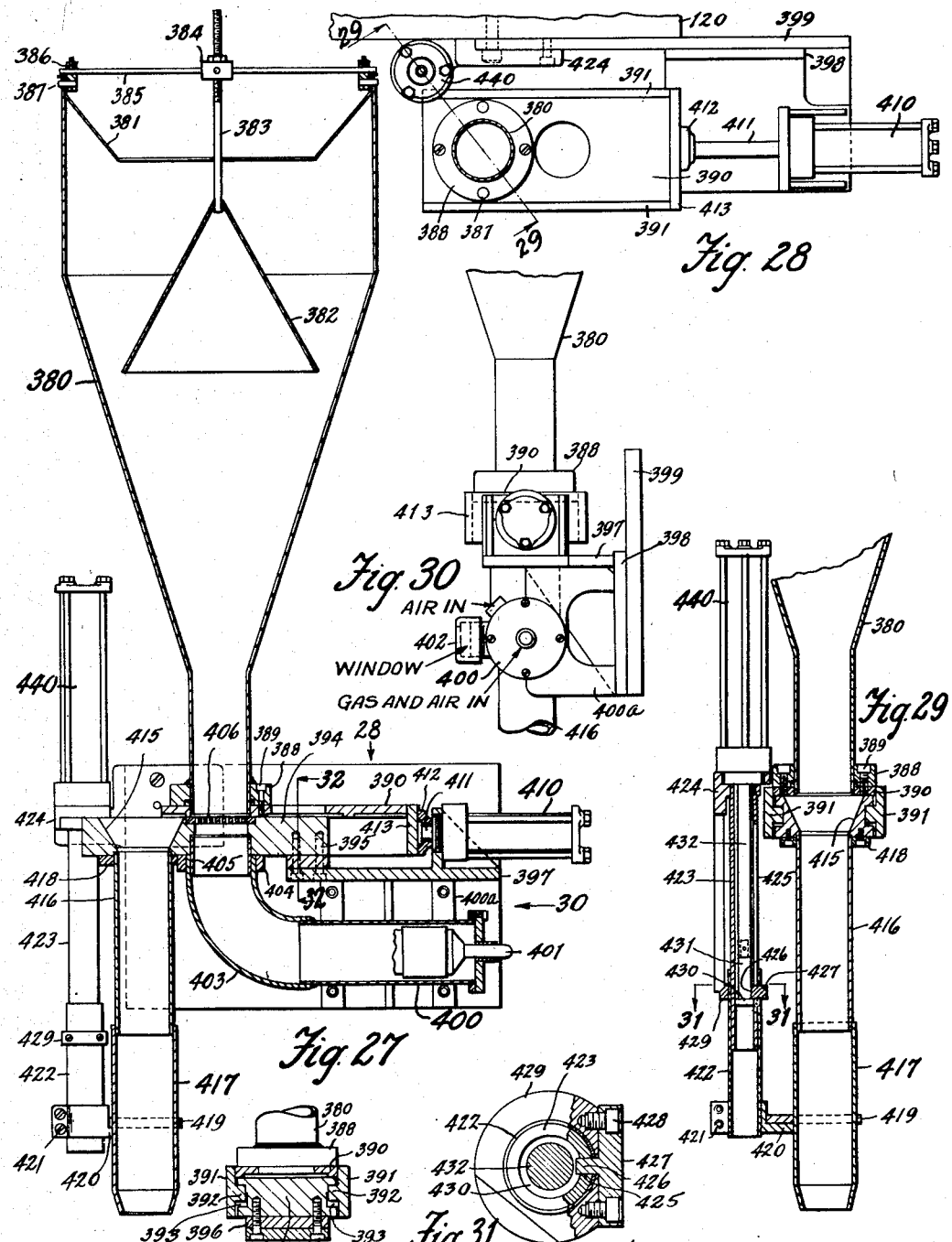

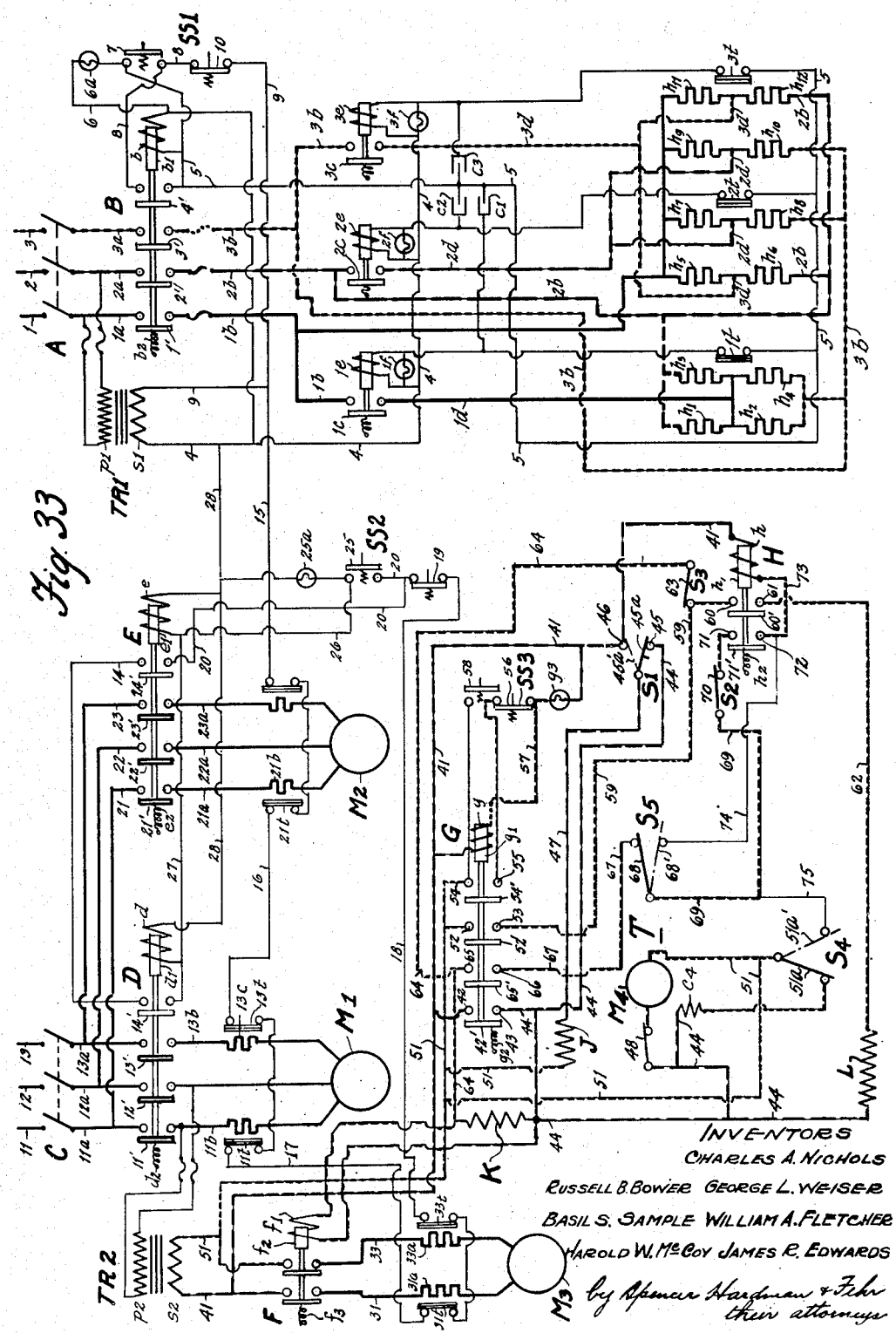

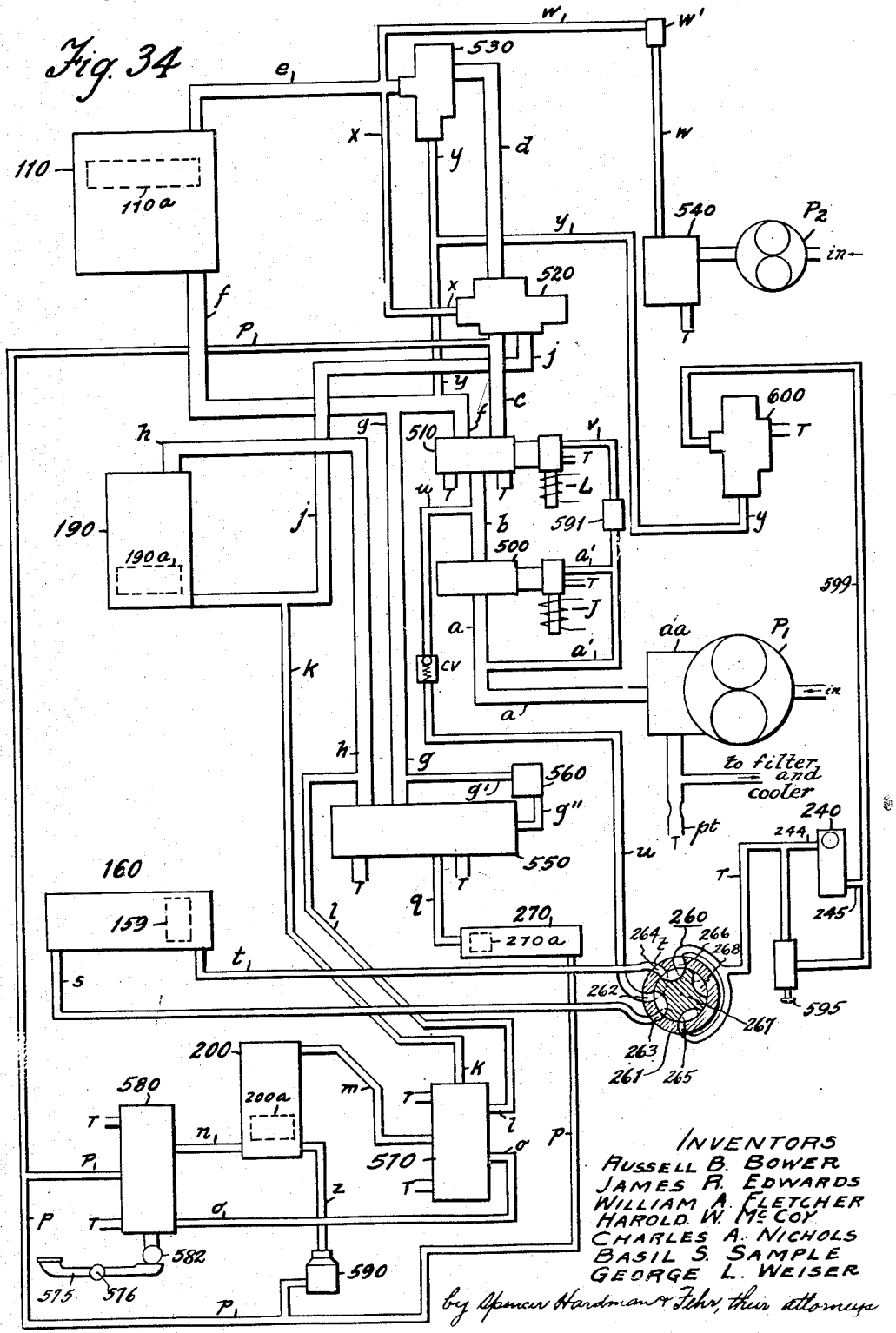

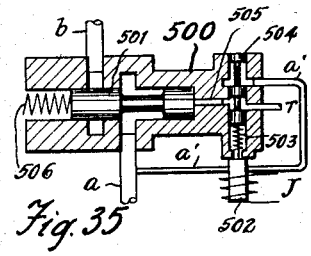
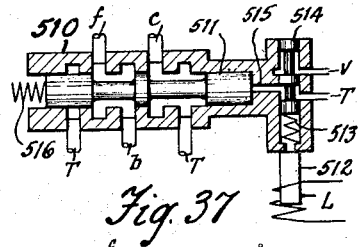
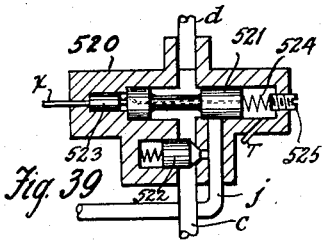
Fig. 35  Fig. 37  Fig. 39
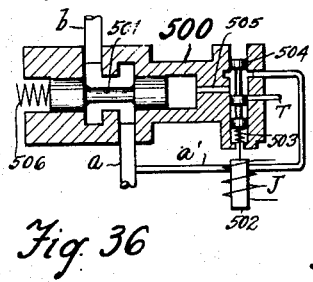
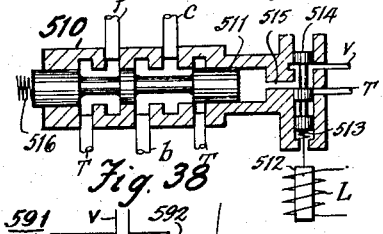
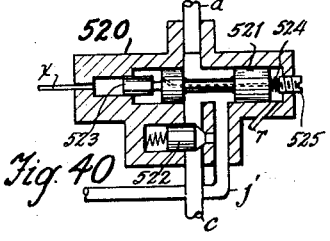
Fig. 36  Fig. 38  Fig. 40
Fig. 38A
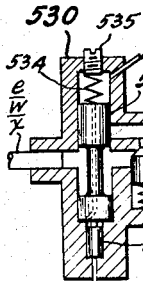
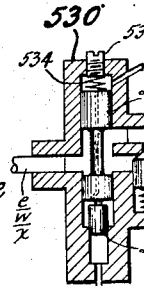
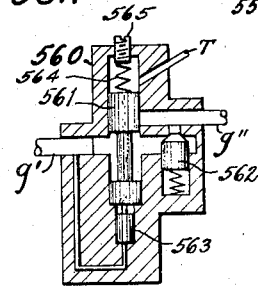
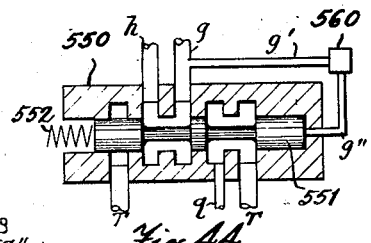
Fig. 41  Fig. 42  Fig. 43  Fig. 44
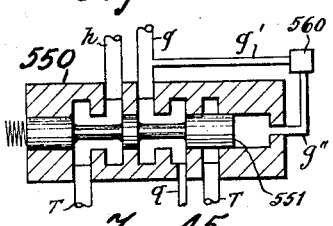
Fig. 45
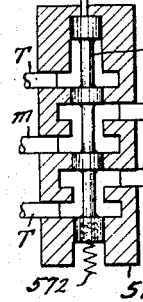
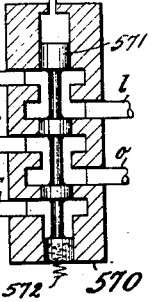
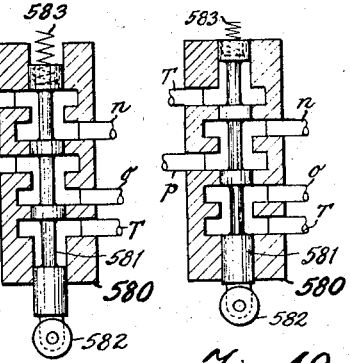
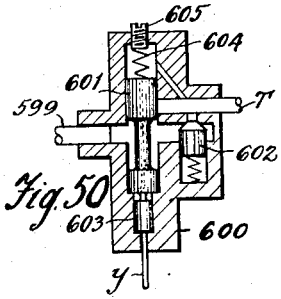
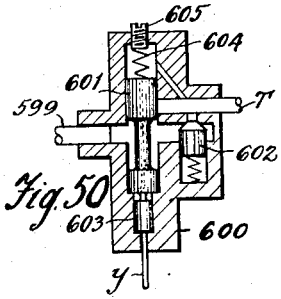
Fig. 46  Fig. 47  Fig. 48  Fig. 49  Fig. 50
INVENTORS
CHARLES A. NICHOLS   RUSSELL B. BOWER
BASIL S. SAMPLE      JAMES R. EDWARDS
GEORGE L. WEISER     WILLIAM A. FLETCHER
                     HAROLD W. McCOY
by Spencer Hardman and Fehr their attorneys Sept. 19, 1950  C. A. NICHOLS ET AL  2,523,137
PLASTIC MOLDING MACHINE
Filed Aug. 22, 1946  20 Sheets-Sheet 18

INVENTORS
RUSSELL B. BOWER
JAMES R. EDWARDS
WILLIAM A. FLETCHER
HAROLD W. McCOY
CHARLES A. NICHOLS
BASIL J. SAMPLE
GEORGE L. WEISER

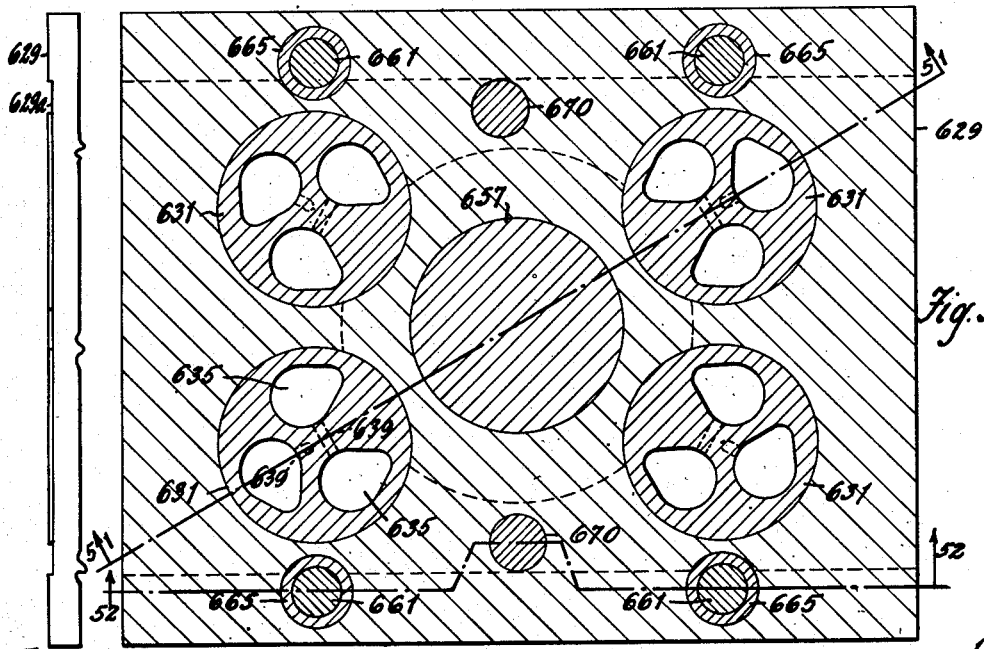
Fig. 55
Fig. 55A
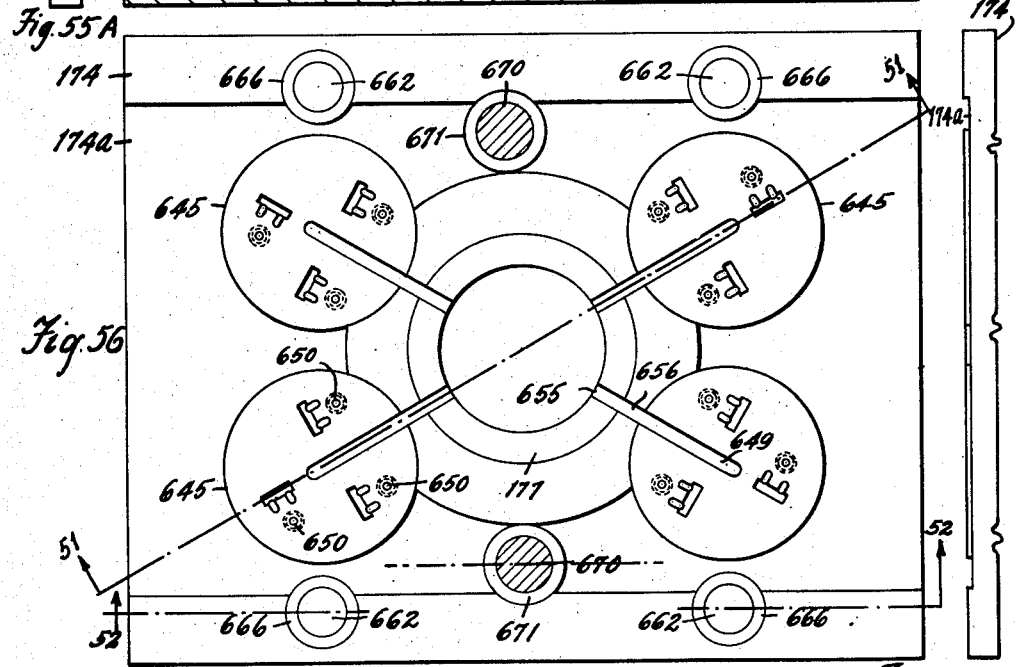
Fig. 56
Fig. 56A

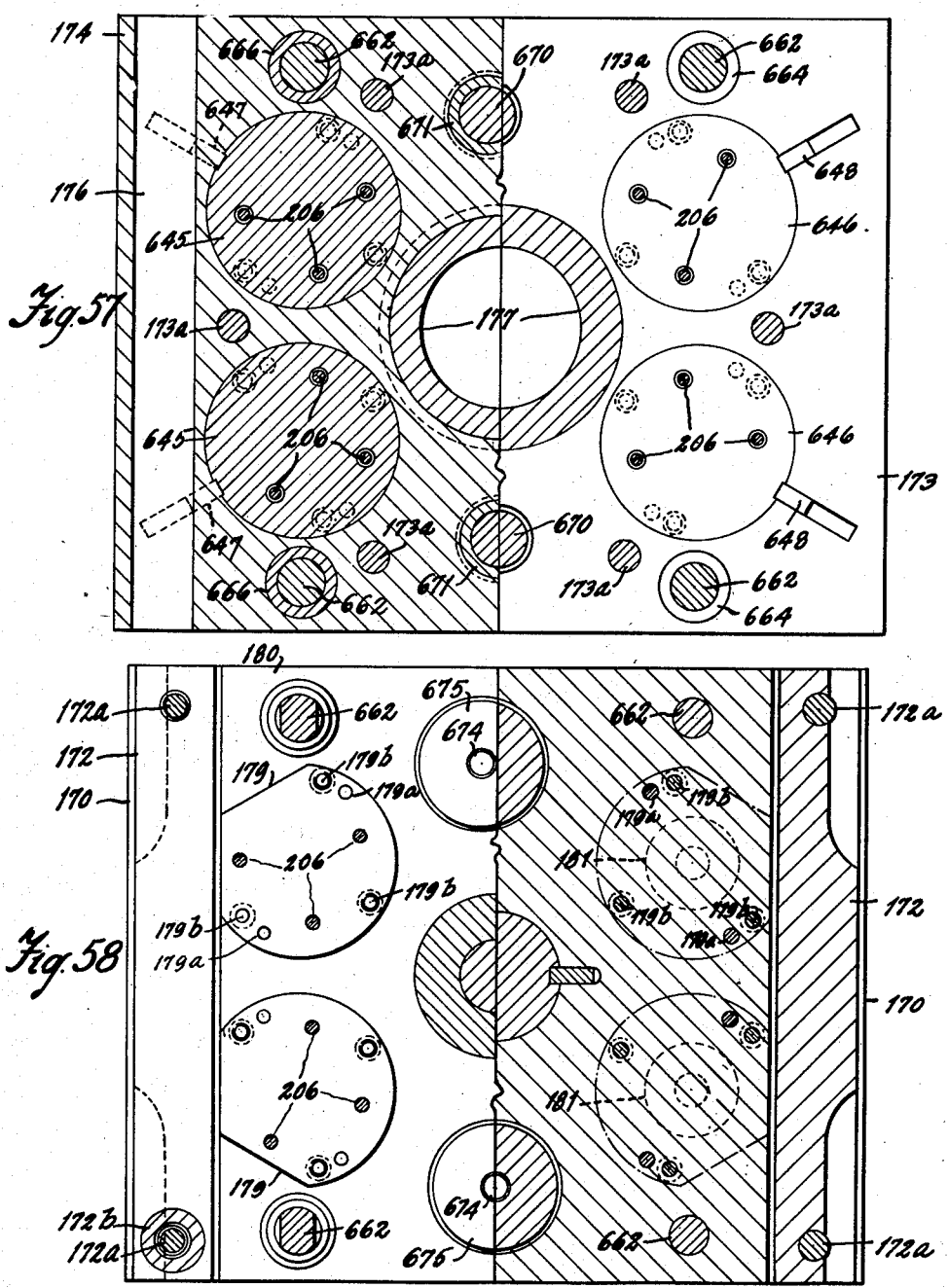

Patented Sept. 19, 1950

2,523,137

UNITED STATES PATENT OFFICE 2,523,137

PLASTIC MOLDING MACHINE

Charles A. Nichols, Russell B. Bower, James R. Edwards, William A. Fletcher, Harold W. McCoy, Basil S. Sample, and George L. Weiser, Anderson, Ind., assignors to General Motors Corporation, Detroit, Mich., a corporation of Delaware Application August 22, 1946, Serial No. 692,274

27 Claims. (Cl. 18—30)

1

This invention relates to the art of molding plastic materials.

Objects of the present invention are to provide a method of preheating molding material while in comminuted form and to provide apparatus for carrying on the method and to provide, in coordination with the apparatus, an injection molding machine which receives the preheated comminuted material and causes it to be forced into mold cavities and therein to be cured under heat and pressure. The disclosed embodiment of the invention provides a hopper for receiving molding material, a measuring device which receives a predetermined quantity of material from the hopper and dumps the material into a vessel from which the material is transferred by air pressure to the top of a preheating chamber in which hot air is ascending at such velocity as to cause the material to be suspended in the chamber while being heated. At the end of the preheating period, the heating chamber is caused to discharge its contents into a compression chamber of a molding die. A companion molding die is caused to be pressed against the die having the compression chamber and the preheated material therein is forced by a piston or ram out of the compression chamber through ducts or runners connected with the die cavities in which the material is cured under heat and pressure.

A further object of the invention is to provide a molding machine having two dies each provided with a compression chamber, either of which is engageable by the same companion die during the curing operation, and to provide means for locating one of said two dies, after loading it with preheated material, at the curing station for engagement by the companion die, while said means locates the other of said two dies at an unloading and reloading station where the molded parts are removed and the compression chamber of that die is reloaded with preheated material.

A further object of the invention is to provide means for causing the various functions of the apparatus and machine to take place in recurrent sequence.

Further objects and advantages of the present invention will be apparent from the following description, reference being had to the accompanying drawings wherein a preferred embodiment of the present invention is clearly shown.

In the drawings:

Fig. 1 is a front elevation of the molding machine and material handling apparatus.

Fig. 2 is a side elevation looking in the direction of arrow 2 of Fig. 1.

Fig. 3 is a fragmentary view partly in side elevation and partly in section, the section being taken on the line 3—3 of Fig. 1.

2

Fig. 4 is a fragmentary sectional view showing a portion of Fig. 3 on a larger scale.

Figure 5:
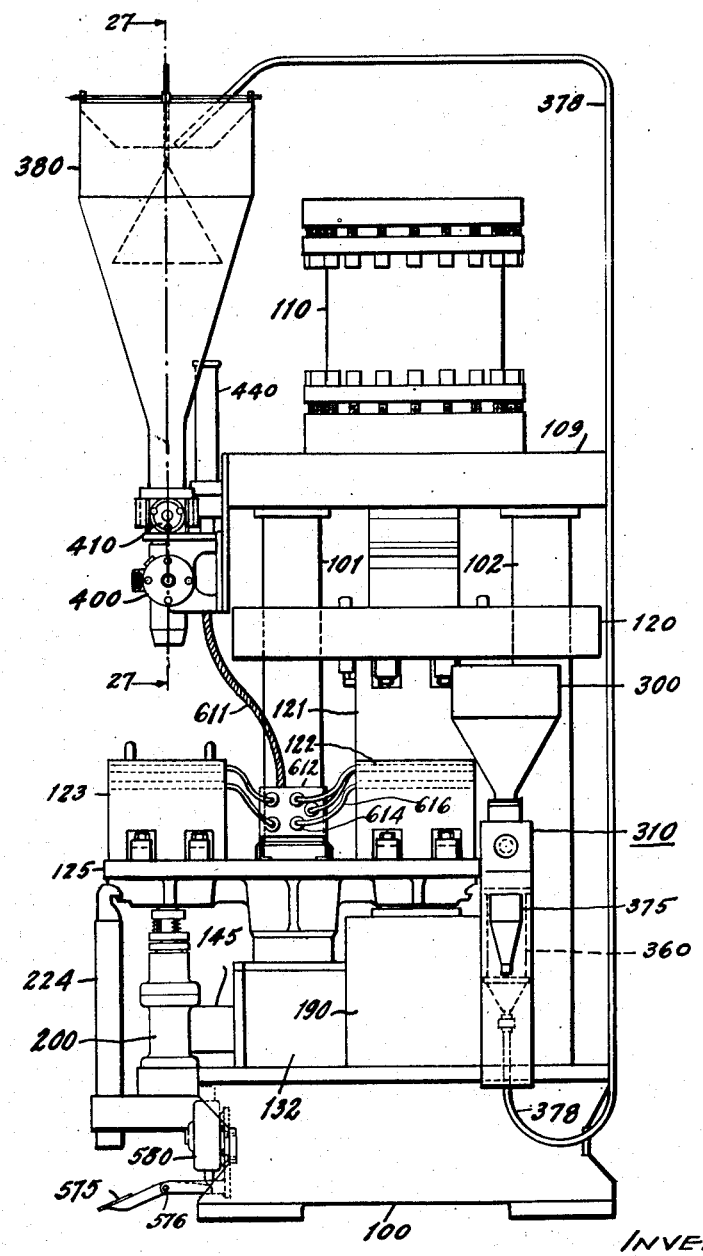

Fig. 5 is a side elevation looking in the direction of arrow 5 of Fig. 1.

Fig. 6 is a fragmentary sectional view on the line 6—6 of Fig. 1.

Fig. 7 is a fragmentary sectional view on the line 7—7 of Fig. 6.

Fig. 8 is a fragmentary view partly in longitudinal section of adjacent parts shown in Fig. 6.

Fig. 9 is a sectional view on the line 9—9 of Fig. 8.

Figure 10:
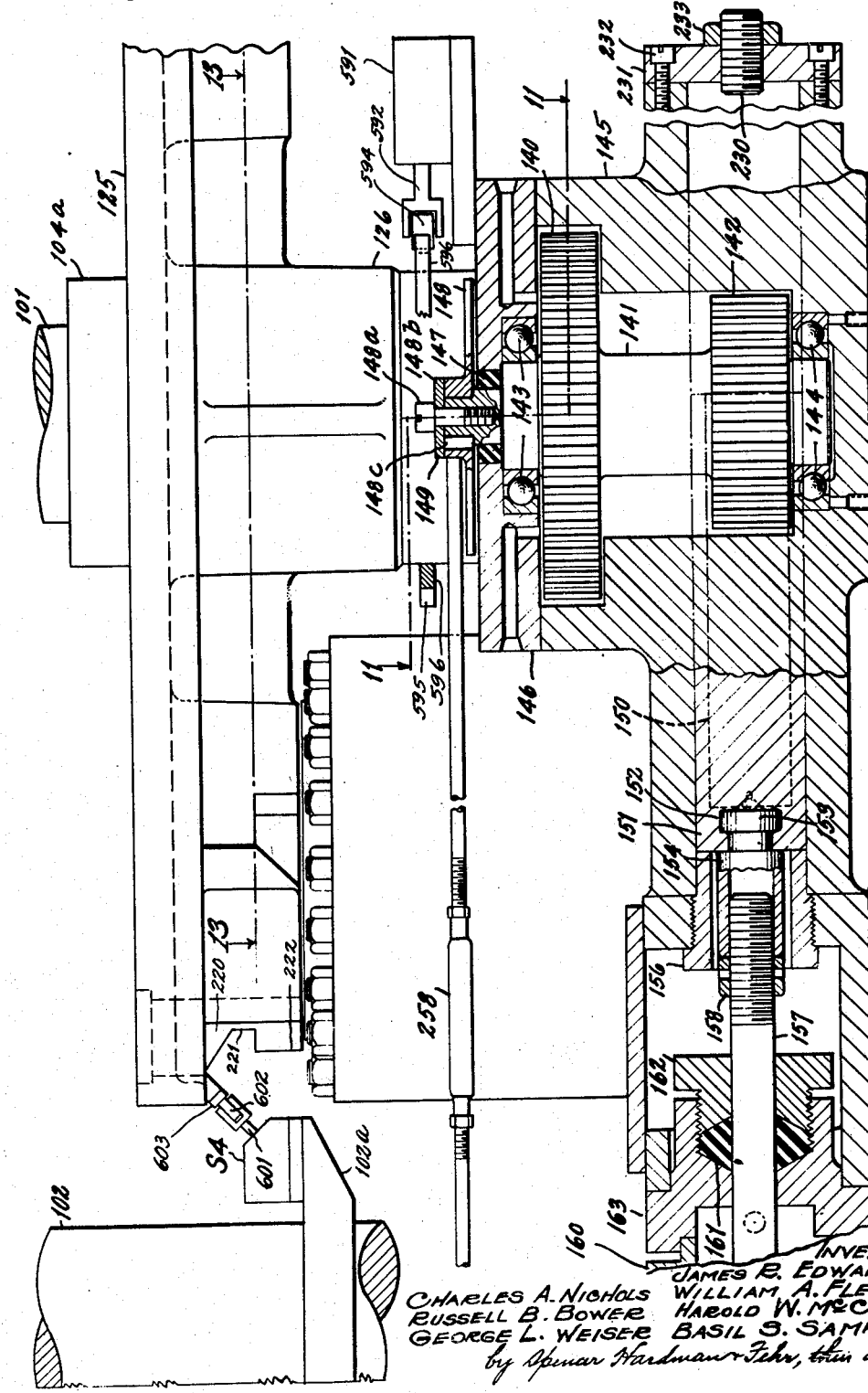
Figure 11:
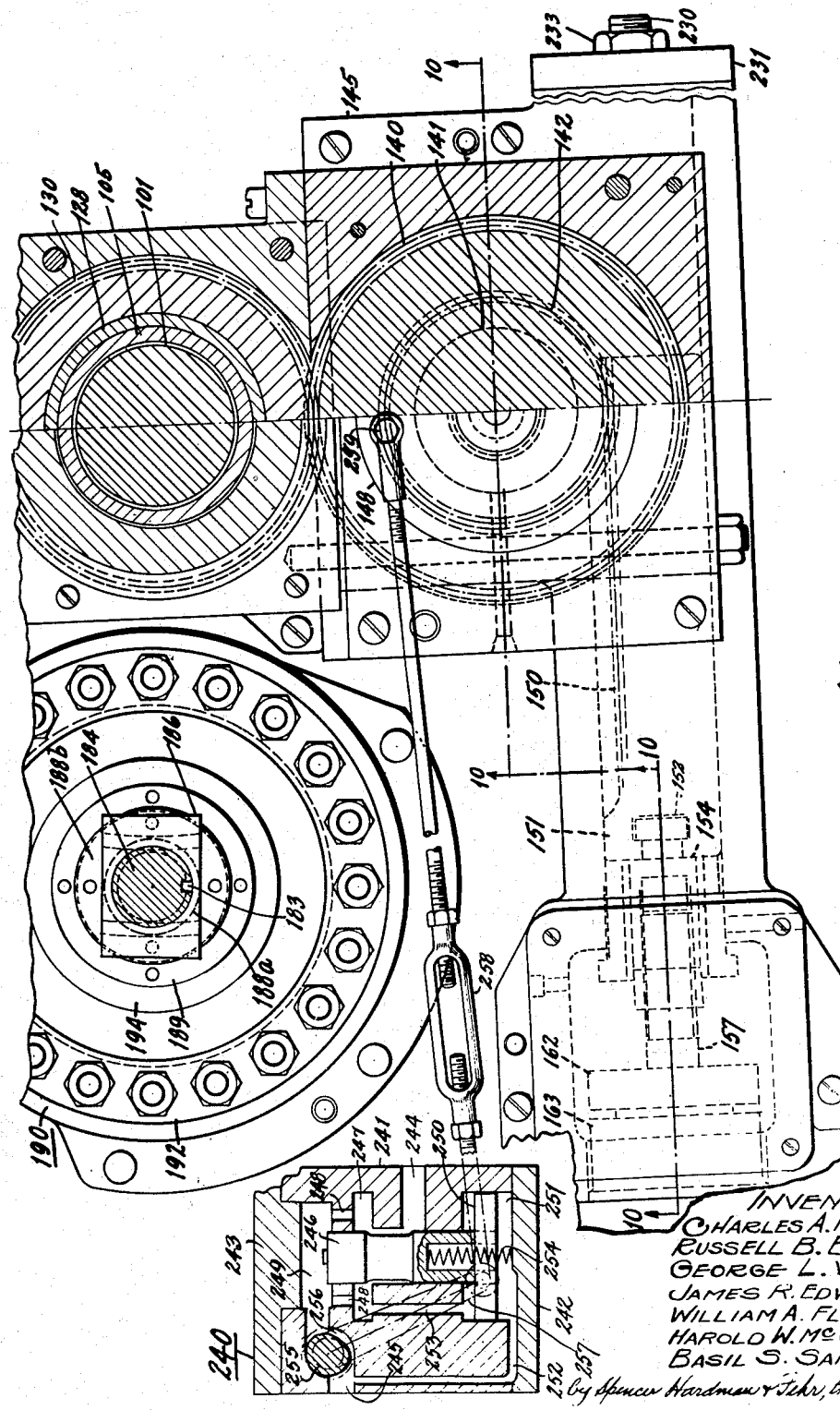

Fig. 10 is a fragmentary side elevation partly in section, the section being on the line 10—10 of Fig. 11.

Fig. 11 is a fragmentary sectional view taken principally on the line 11—11 of Fig. 6 and on line 11—11 of Fig. 10 and includes a sectional view of a valve 240, the side elevation of which is shown in Fig. 2.

Figures 12, 13:
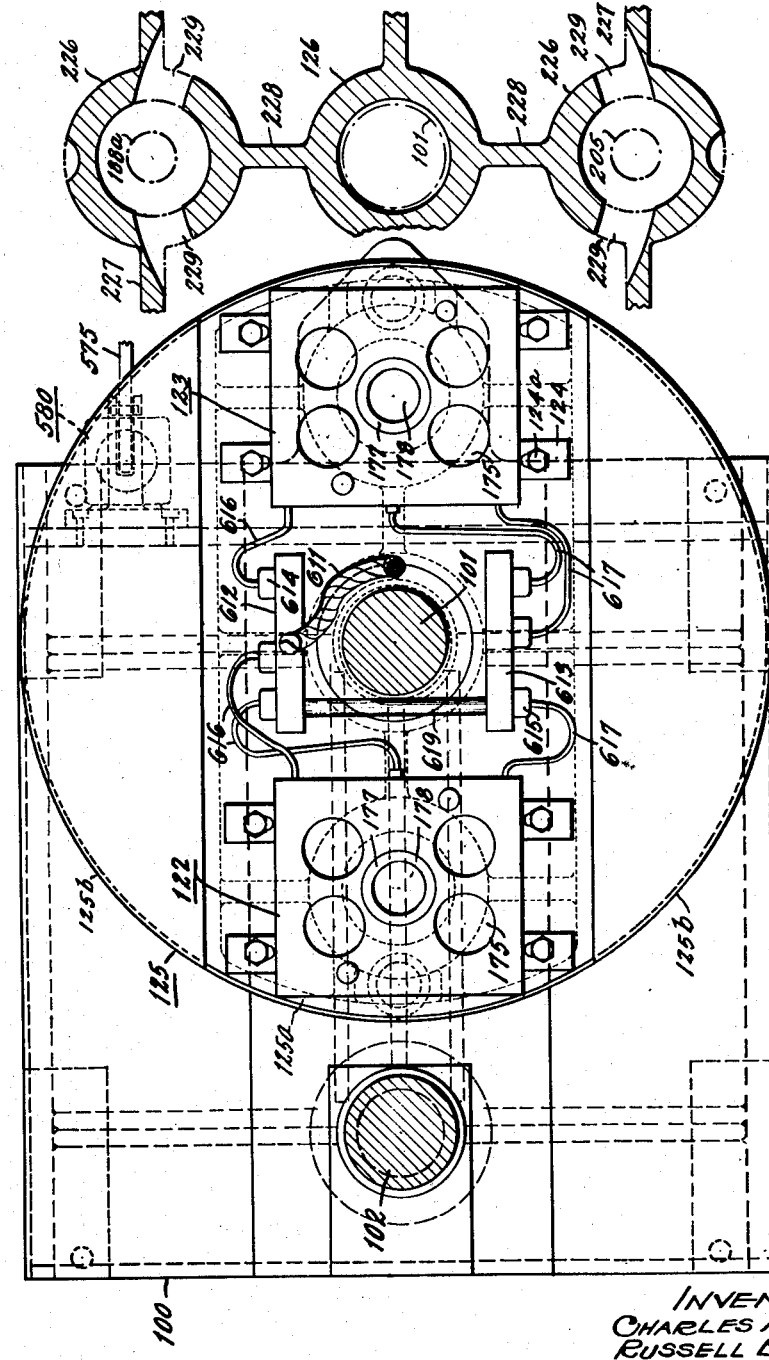

Fig. 12 is a fragmentary sectional view on line 12—12 of Fig. 2.

Fig. 13 is a fragmentary sectional view on line 13—13 of Fig. 10.

Figure 14:
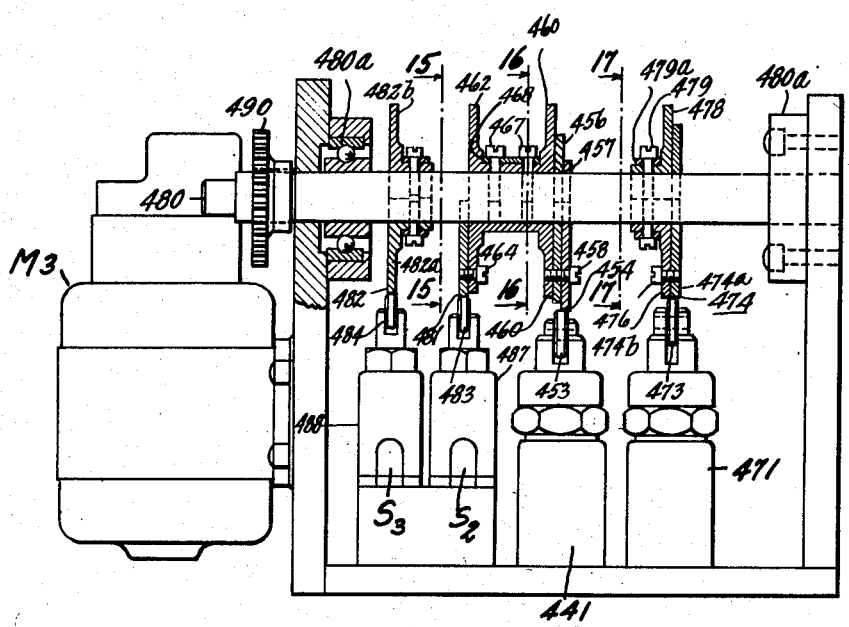

Fig. 14 is a side elevation, partly in section, of a group of cam controlled switches and valves.

Figure 15:
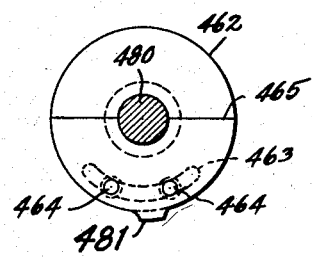
Figure 16:
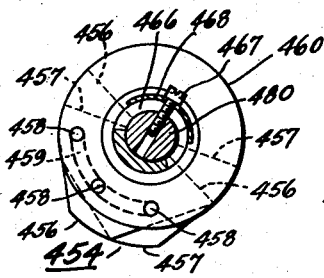
Figure 17:
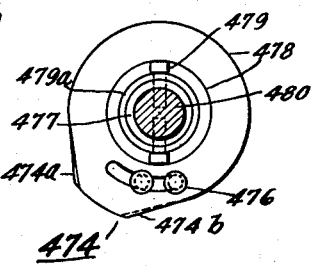

Figs. 15, 16 and 17 are sectional views taken respectively on lines 15—15, 16—16 and 17—17 of Fig. 14.

Figure 18:
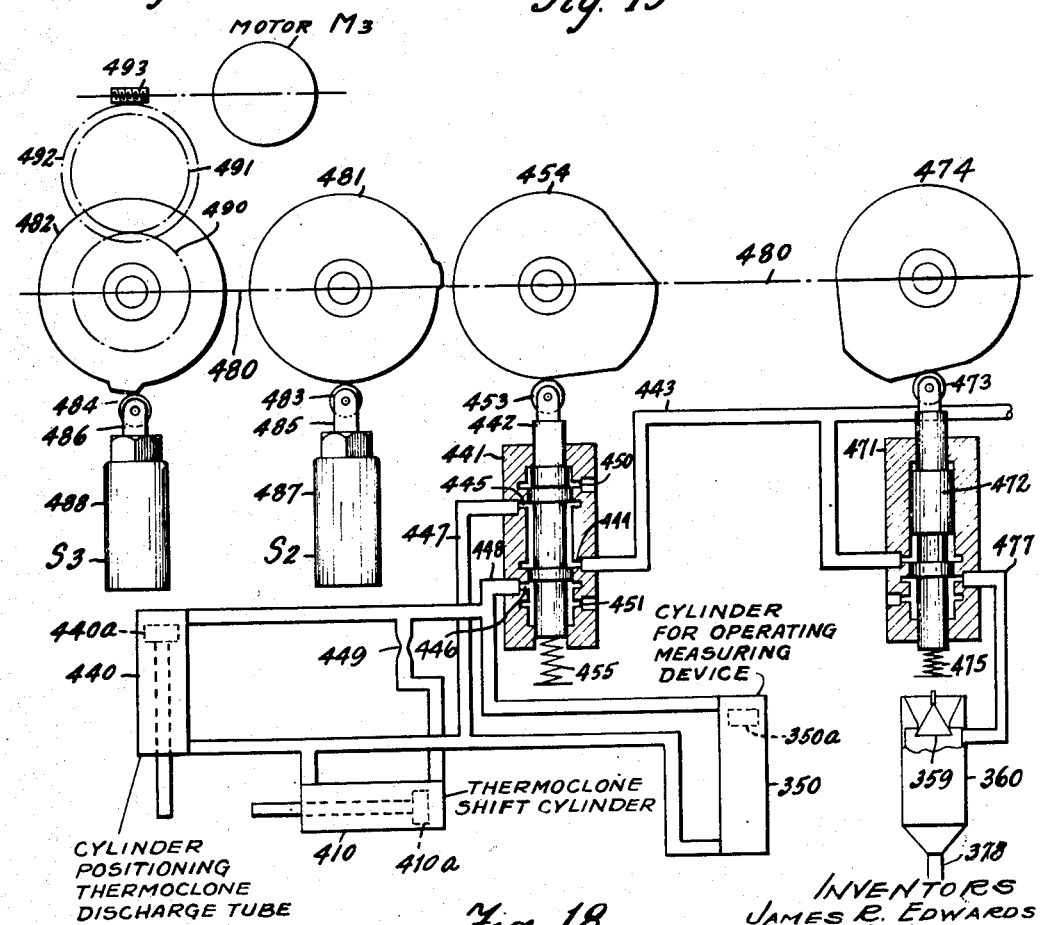

Fig. 18 is a diagram showing relation of the cams which operate the switches and valves of Fig. 14, together with a pneumatic circuit controlled by the valves.

Figures 19, 20:
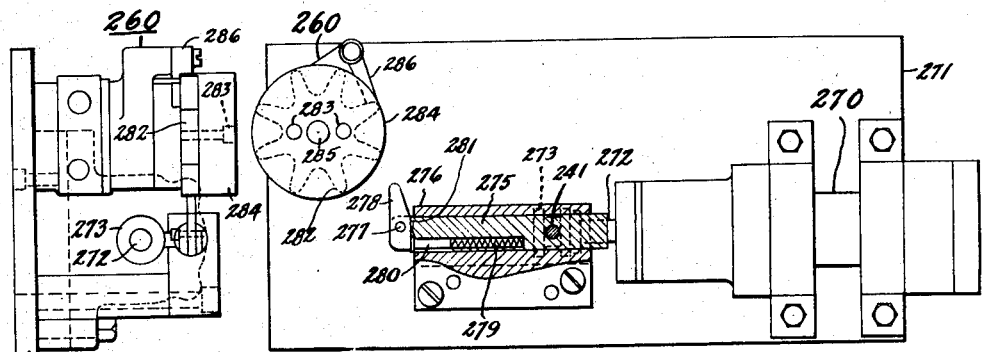

Fig. 19 is a side view partly in section of an assembly of an hydraulic circuit reversing valve and means for operating it.

Fig. 20 is a view taken in the direction of arrow 20 of Fig. 19.

Fig. 21 is a side elevation, partly broken away, of the apparatus for measuring charges of molding material and causing the same to be transferred to apparatus for heating the material prior to discharge into a mold. This view is drawn to a larger scale than the view of this apparatus which appears in Fig. 1.

Figs. 22 and 23 are views taken in the directions, respectively, of arrows 22 and 23 of Fig. 21.

Fig. 24 is a sectional view on line 24—24 of Fig. 22.

Fig. 25 is a sectional view on line 25—25 of Fig. 24.

Fig. 26 is a sectional view on line 26—26 of Fig. 24.

Fig. 27 is a sectional fragmentary view of the apparatus for heating the molding material prior to discharge into a mold and this view is taken principally on the line 27—27 of Fig. 5.

Fig. 28 is a fragmentary plan view in the direction of arrow 28 of Fig. 27.

Fig. 29 is a fragmentary sectional view on the line 29—29 of Fig. 28.

Fig. 30 is a fragmentary end view in the direction of arrow 30 of Fig. 27.

Fig. 31 is a sectional view on line 31—31 of Fig. 29.

Fig. 32 is a sectional view on line 32—32 of Fig. 27.

Fig. 33 is a diagram of the electrical system of the apparatus.

Fig. 34 is a diagram of the hydraulic system of the apparatus.

Figs. 35 to 50 are diagrammatic sectional views of various valves used in the hydraulic system.

Figure 51:
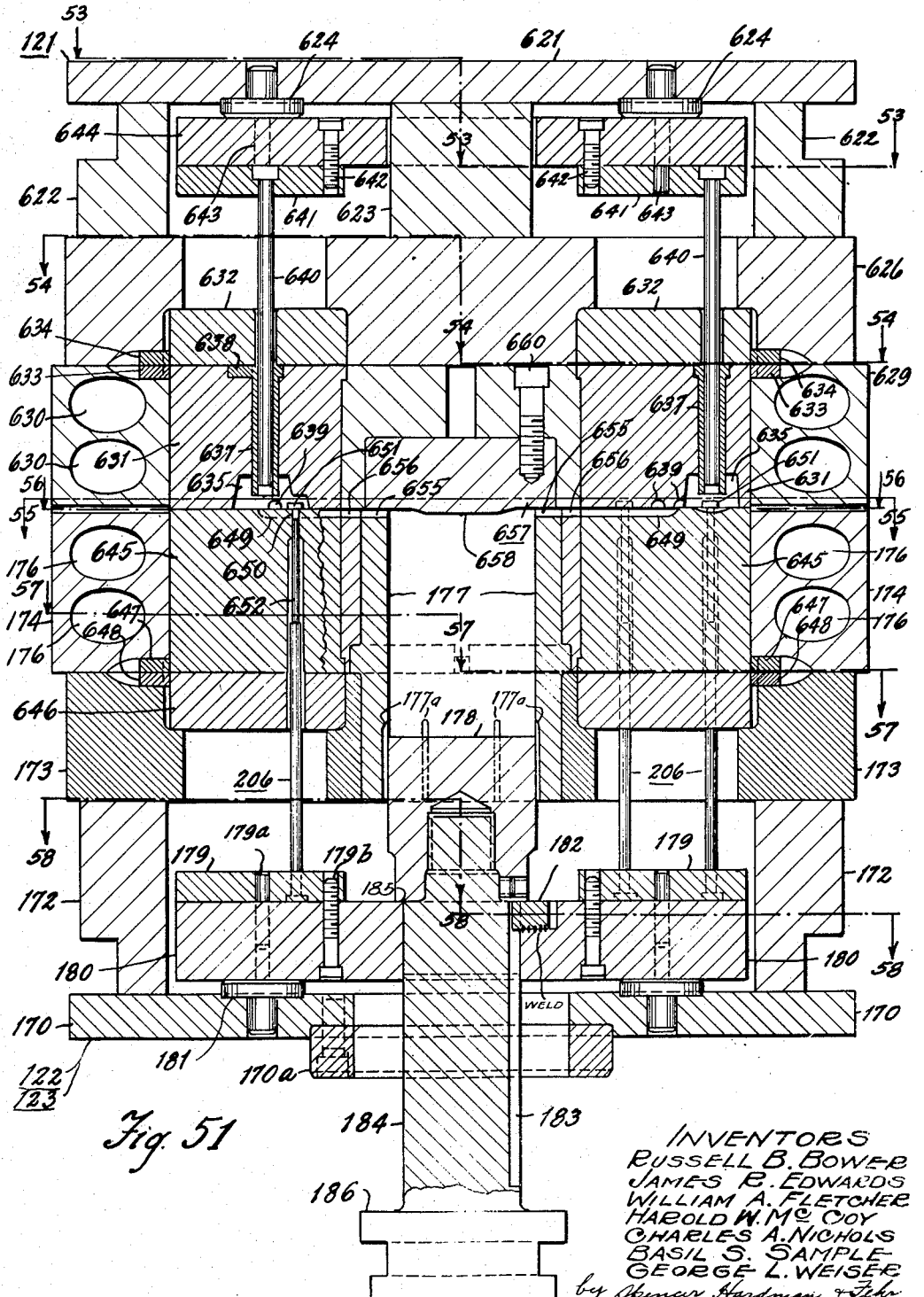

Fig. 51 is a longitudinal sectional view of the upper and lower dies in closed position, said section being taken on the line 51—51 of Fig. 55.

Figure 52:
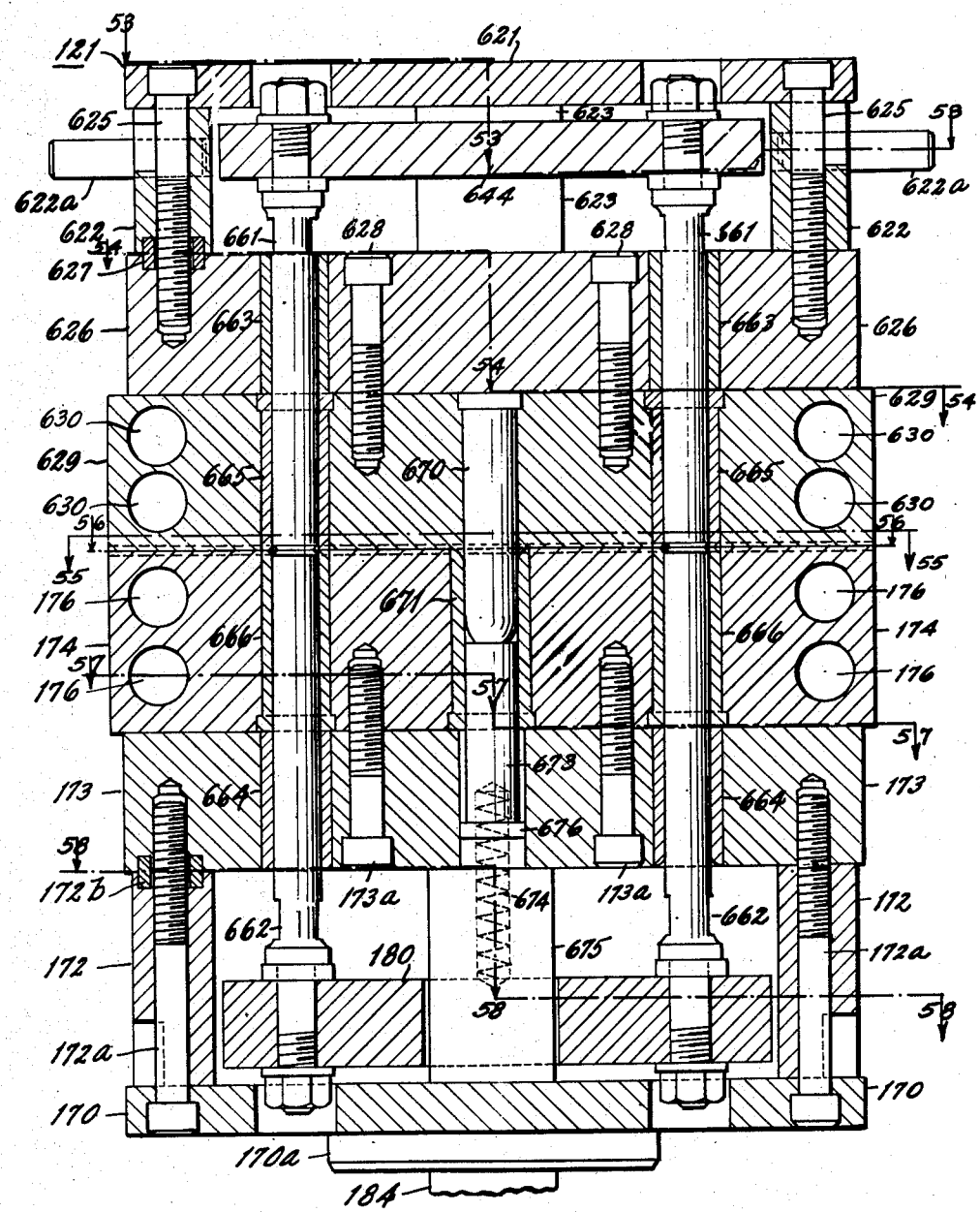

Fig. 52 is a longitudinal sectional view taken on the line 52—52 of Fig. 55.

Figure 53:
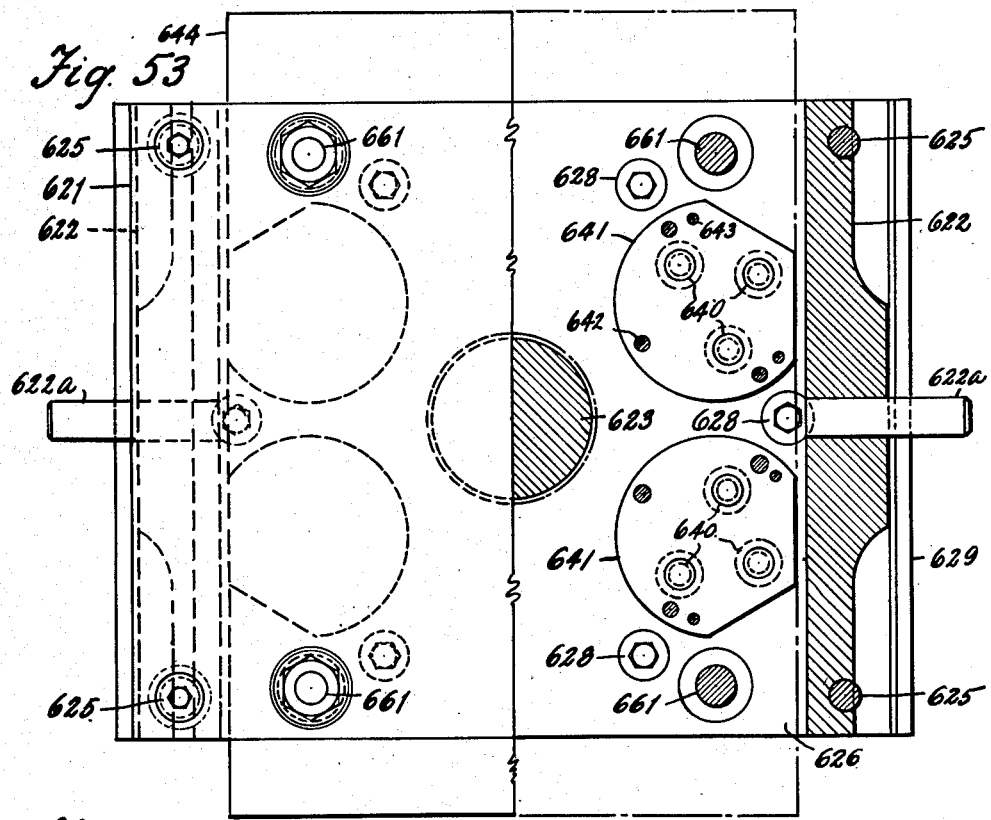

Fig. 53 is a view partly in section taken on the line 53—53—53 of Figs. 51 and 52.

Figure 54:
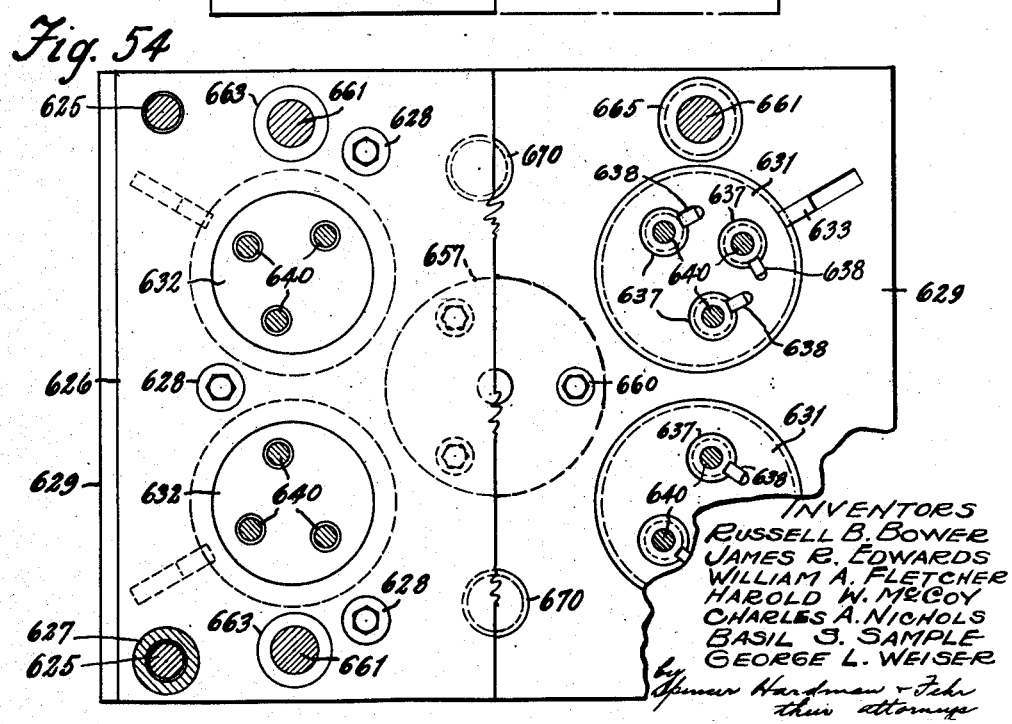

Fig. 54 is a sectional view on line 54—54—54 of Figs. 51 and 52.

Fig. 55 is a sectional view on line 55—55 of Fig. 51.

Fig. 55a is a fragmentary edge view of the lowermost plate of the upper die and shows the profile of the lower surface thereof.

Fig. 56 is a plan view of the lower die and the parts shown in section are on the line 56—56 of Fig. 51.

Fig. 56a is a fragmentary edge view of the topmost plate of the lower die and shows the profile of the upper surface thereof.

Figs. 57 and 58 are sectional views of the lower die taken respectively on lines 57—57 and 58—58 of Figs. 51 and 52.

Figure 59:
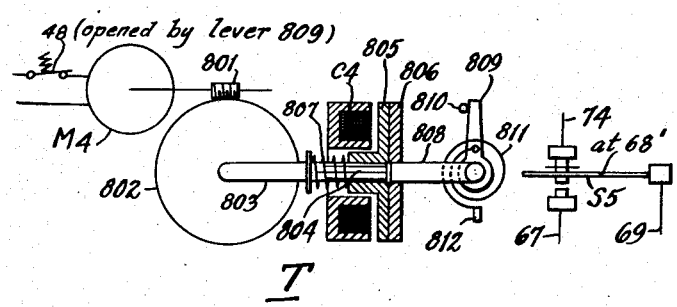

Figure 59 is a diagram of the time T shown in Figure 33.

Referring chiefly to Figs. 2 and 6, the machine comprises a base 100 supporting posts 101 and 102. Post 101 receives a nut 103 (Fig. 6) which when tightened draws a shoulder 104 of the post 101 (Fig. 6) against a tube 105 and forces the latter against an upper surface of the base 100. The tightening of a nut 107 on the post 102 draws a shoulder 108 of the post against an upper surface of the base 100.

The posts 101 and 102 support a bar 109 which supports a cylinder 110 attached to the bar 109 by screws 111 as shown in Fig. 3. Each of the posts 101 and 102 is attached to the bar 109 in the manner shown in Fig. 3. The threaded end of each post receives a nut 112 received by a counterbore in the bar. When the nut 112 is tightened, the bar 109 is clamped against a washer 212 which, in turn, is clamped against a shoulder 114 of the post. The cylinder 110 receives a piston 110a (Fig. 34) attached to a rod 115 (Fig. 3) threadedly connected with a coupling member 116 by screws 117 attached to the upper one of a plurality of spacers 118 of different thicknesses. Screws 119 attach all of these spacers to a bar 120 which supports an upper die 121. Bar 120 is provided with bearings 120a which slide on the posts 101 and 102. The upper die 121 is adapted to engage either one of two lower dies 122, 123 mounted on an oscillatable table 125. These dies are secured to their respective supports by angle bars 124 and screws 124a.

Referring to Fig. 6, the table 125 has a central tubular hub 126 provided with bearing bushings 127 by which the hub is journaled on the tube 105. To the lower end of hub 126, a gear 130 is attached by screws 129. Gear 130 rests upon the upper race 131a of a roller thrust bearing 131, the lower race 131b of which rests upon a surface of a frame 132 through which the tube 105 extends. A packing ring 133 carried by the frame 132 seals the gap between the hub and the frame. The hub extends through a plate 134 which is attached to the upper surface of the frame 132 and which carries a packing ring 135 which seals the gap between the hub 126 and the ring 134.

Referring to Fig. 11, it will be seen that the gear 130 is driven by a gear 140 which, as shown in Fig. 10, is integral with a shaft 141 integral with a gear 142. Shaft 141 is journalled in ball bearings 143 and 144 provided by frame 145 which houses the gears and the mechanism for driving them. Frame 145 supports a cover 146 into which the bearing 143 is recessed. Cover 146 supports a packing ring 147 for sealing the gap between the shaft 141 and the cover. Shaft 141 drives a disc 148 connected therewith by key 148c and a screw 148a which retains a washer 148b. The function of the crank disc 148 will be described later.

As shown in Figs. 10 and 11, the gear 142 meshes with a rack 150 integral with a bar 151 which is guided by the frame 145. Bar 151 has a T-slot 152 which receives a T-head 153 of a nut 154 extending through a hole in a stop bushing 156 threaded into the frame 145. Nut 154 is threadedly connected with a rod 157 in the desired position of adjustment which is retained by lock nut 158. Rod 157 is attached to a piston 159 (Fig. 34) in a cylinder 160 (Fig. 2). Rod 157 slides through a packing 161 retained by a packing gland 162 threaded into the head end 163 of the cylinder 160 which is attached to the frame 145. The movement of the piston 159 of cylinder 160 in one direction causes the table 125 to rotate 180° in one direction, and movement of the piston in the opposite direction causes the table to rotate 180° in the opposite direction. Rotation of the table is determined by movement of bar 151 (Fig. 10) which, at the left end of its travel, strikes the stop bushing 156, and which, at the right end of its travel strikes a screw 230 threaded into a cover block 231 attached by screws 232 to frame 145. A nut 233 secures the screw 230 in the desired position of adjustment. These movements of table 125 cause a lower die, such as 122, to be located under the upper die 121, while the other lower die 123 is located in a position for unloading the molded parts and for reloading the die with inserts, when required, and with molding powder which has been preheated in a manner to be described.

As shown in Fig. 6, each of the lower dies 122, 123 comprises a base 170, supported above the table 125 by a spacer 171 of a material having low heat conductivity, and secured thereon by the angle clamps 124 and screws 124a. The base 170 supports two bars 172 which, in turn, support plates 173 and 174 providing cavities 175 for receiving die blocks shown in Figs. 51 to 56 which will be described later. Plate 174 provides holes 176 for receiving certain one of the heating elements $h_1$ to $h_{12}$ shown diagrammatically in Fig. 33 to be described. The plates 173 and 174 support a compression cylinder 177 which receives a compression piston 178 which extends through a plate 180 supporting ejector pin plates 179 and normally resting on buttons 181 carried by base 170. The plate 180 provides a recess for a key 182 welded into plate 180. Key 182 is received by a longitudinal groove 183 in the rod 184 attached to the piston 178 and joining the piston at a shoulder 185 which, in the lower position of the piston, rests upon the plate 180. Since the plates 179 and 180 are aligned by pins 662, rotation thereof about the axis of cylinder 177 is only slightly permissible. Since the rod 183 is longitudinally splined to the plate 180, it can rotate but slightly.

The lower end of rod 184 is integral with a head 186 having a T-slot 187 which, when molded 122 or 123 is under mold 121, embraces the T-head 188a of a screw 188 which is attached to the rod 189 of a piston 190a of a cylinder 190 attached to the base 100. The cylinder 190 is attached by screws 191 to its ends 192 and 193. End 192 carries packing rings 194 through which the rod 139a passes. The bottom end 193 provides a recess for a spring 195 which urges upwardly a plunger 196 retained by a screw plug 197 threaded into the end 193. When there is no fluid pressure above the piston 190a, the plunger 196 elevates the piston slightly above the end 193 in order that there will be clearance between the T-head 188a and the surfaces of the T-slot 187 of the head 186 of rod 184. This clearance should exist when the shoulder of the plunger 196 is positioned by the spring 195 against the plug 197. When there is fluid pressure above the piston 190a, the piston will bottom on the end 193 and the head 188a of the plug will pull down on the head 186 of rod 184 and cause the plate 180 to bottom on the buttons 181. In order that this may occur, some adjustment of the plug 188 relative to the piston 190a may be required. For this reason, the plug 188 is screw threaded into the rod 189 and can be adjusted in order to obtain the desired effect and then locked in adjusted position by lock nut 188b. When the piston 190a bottoms on the cylinder at 193, the flange of the plunger 196 is spaced slightly below the plug 197. When fluid pressure above the piston 189 is relieved, the spring 195 pushes the plunger 196 up to raise the piston 190a and hence the T-head 188a slightly above the flanges of the T-slot 187 in head 186 to provide clearance so that the table 125 can be rotated without any frictional engagement between the parts 188a and 186.

The function of the cylinder 110 (Fig. 2) is to contain the pressure fluid which raises and lowers its piston 110a (Fig. 34) which causes the upper die 121 to be pressed firmly against a lower die before plastic material is forced into the mold cavities. The function of the cylinder 190 is to contain the pressure fluid which effects the movements of the piston 190a which, through its connection with a compression ram 178, causes plastic material to be compressed in the cylinder 177 and to flow therefrom through runners to the die cavities. This will be described in detail later. The upper die 121 is maintained forcibly against a lower die while plastic material therein is being cured under pressure and heat supplied by the heating elements within the dies. During curing the piston 178 remains up. In a manner to be described later, after the curing cycle, the piston 178 moves down under the action of fluid pressure above the piston 190a and the die 121 moves up under the action of pressure fluid beneath the piston 110a. After the curing cycle, the die beneath the upper die 121 is moved by rotation of the table 125 into a position for unloading and reloading; and it is replaced by a loaded lower die.

Fig. 6 shows a die 123 at the loading station. At this station, the molded material is ejected by means including an ejection cylinder 200 containing a piston 200a (Fig. 34). Cylinder 200 is attached to an end 201 attached to the base 100 and attached to an upper head end 202 through which the rod 203 (connected with piston 200a) passes. Rod 203 passes through packing retained by a packing gland member 204. The upper end of the rod 203 is threadedly connected with a T-head 205 which, like the T-head 188a, previously described, is adapted to be received by the T-slot of the head 186 of compression piston rod 184. When pressure fluid is admitted below the piston 200a, it rises to cause the head 186 to move upwardly. The stroke of the piston 200a is such that the head 186 will engage the plate 180 and cause it to move upwardly thereby effecting upward movement of ejection pins 206 attached to plates 179 to force the molded work from the lower die to such position that it can be easily removed by the operator, who then cleans the die cavities by compressed air and other means and then reloads the mold with inserts as required. The relation of the pins 206 to the work will be shown later.

After a lower die is prepared for charge of the molding powder, pressure fluid is admitted to the upper side of piston 200a to cause the rod 103 to move downwardly, its head 205 being engaged with the flanges of the head 186 during the downward movement to return the compression piston 178 to lowest position and to cause descent of the plate 180 upon the buttons 181. After this has been done pressure fluid above the piston 200a is relieved as well as below to permit a slight elevation of the head 205 in order to provide clearance between head 205 and the head 186. This slight raising of the head 205 is effected by springs 207 which are confined under compression by the plate 208 and a plate 209 urged upwardly by these springs against the lower edge of the head 205. Each spring 207 surrounds a screw 210 whose head is received in a counterbore in the plate 209 and whose lower end threadedly engages the plate 208 and is clamped in adjusted position by clamping screw 211. Plate 208 is threadedly engaged by a plurality of screws 212 clamped in adjusted position by clamp screws 213. Screws 212 pass through the flange of the packing gland 204 which is stationary. The heads of the screw 212 are received by counterbores in the under surface of said flange. The plates 208 and 209 are not fastened to the rod 203 so there can be relative movement. Screws 212 are so adjusted that their heads bottom on the upper end of the cylinder end 202. The screws 210 are so adjusted that the plate 209 engages the under sides of the heads of the screws 210 when the springs 207 have expanded sufficiently to provide clearance between the coupling members 205 and 186. When pressure fluid exists above the piston 200a to cause the rod 184 to move down as far as it will go, the head 205 will engage the lower flanges of the head 186 and plate 209 will be pulled down to compress the springs 207 beyond their normal state of compression thereby forcing screws 212 down against cylinder end 202. Then there will be a slight clearance between the plate 209 and the under sides of the heads of screws 210. When pressure fluid is relieved above the piston 200a, the springs 207 can expand to take up this clearance and cause the plate 209 to move up to push the coupling head 205 up to cause it to clear the coupling head 186. Thus the table 125 can rotate without frictional engagement between the coupling heads 205 and 186.

When pressure is being applied by the die closing piston 110a to force the die 121 against the lower die beneath it, the left side of the table 125 (Fig. 6) is deflected slightly to take up the small clearance between it and the cylinder end 192. Thus the force of the upper die upon the lower die is transmitted to the base 100 through the parts of cylinder 190. When the piston of cylinder 200 is forced up to eject the molded parts from the lower die, ram coupling head 186 strikes plate 180 to lift the plates 179 carrying the ejector pins 206 and plates 179 engage die plate 173. This tends to deflect the right end (Fig. 6) of the table 125 upwardly. To reduce the strain on the table and its center bearings, it is desirable to transmit to the base 100 the force transmitted from the piston of cylinder 200 to the die at the loading station. For this purpose, each end of the table is provided with a large pin 220 having a notch 221 defining a hook 222 which is adapted to be engaged by hook 223 provided by post 224 attached to the base by a nut 225. While the lower die at the loading station is not being forced up by fluid pressure in cylinder 200, there will be clearance between the hooks 222 and 223 so that the table 125 can move freely without any frictional engagement between these hooks. When the pressure is applied from cylinder 200 to the die at the loading station, the clearance between parts 222 and 223 is taken up so that post 224 is placed under tension as it transmits to the base 100 at least a major portion of the force applied by fluid pressure in cylinder 200 to the die at the loading station. On account of the mass to be moved each time the table is indexed, it is desirable that the mass of the table be minimized. Therefore the table is not made so heavy as to be capable of resisting unaided all deflections. Hence means have been provided for transferring stresses to the base so that the table will not be unduly deflected. While giving consideration to reduction of its mass, the table 125 is strengthened by its tubular hub 126 and by tubular portions 226 (Fig. 13) surrounding the compression piston rods 184 and by webs and ribs 227 and 228. The tubular parts 226 are provided with arcuate notches 229, the center of curvature being the center of the hub 126. These notches 229 provide clearance between the tubular parts 226 and the compression piston coupling head 188a or the ejector piston coupling head 205 as the table 125 swings around.

Since the table 125 and parts supported thereby have considerable mass it is desirable that its rotation be started by somewhat gradual application of fluid pressure to the piston 159 of cylinder 160 the presure flow increasing as rotation of the table continues and to gradually diminish the flow of pressure fluid as the table approaches the end of its travel so as to minimize the strain on the operating parts and the stops which determine the amount of movement of the rack 150 (Fig. 10). For this purpose the flow of pressure fluid exhausted from the cylinder 160 is under control by a suitable flow metering valve 240. Fig. 11 shows a Vickers valve having a body 241 and cover 242 and 243. Body 241 provides an inlet 244 and an outlet 245. A valve 246 controls flow from inlet 244 to a chamber 247 which ducts 248 connect with a chamber 249. Valve 246 is connected with a piston 250 operating in a cylinder 251, one end of which is connected by a passage 252 with the outlet 245. The other end of the cylinder 251 is connected by passage 253 with chamber 247. A spring 254 urges the valve 240 toward open position. A shaft 255 which is journalled in the block 241 is so shaped as to provide an adjustable metering orifice 256. The flow control valve 240 as shown in Fig. 11 is a back pressure valve having the adjustable metering orifice 256 that restricts the flow of oil discharged from the cylinder 160. The valve 240 includes a pressure reducing valve 246 which is intended to keep the pressure on the orifice 256 constant and, therefore, it keeps the rate of travel of piston 159 constant as long as the orifice 256 remains the same. The oil discharged from the cylinder 160 flows in at 244 and through the passages 247 and past the orifice 256. If pressure builds up in the orifice 256, it also builds up through the passage 253 on piston 250 to push it down to restrict the flow from passage 244 past the valve 246 until the pressure at the orifice 256 drops. It is therefore apparent that the rate of travel of piston 159 depends on the width of metering orifice 256. Initially, the orifice 256 is relatively narrow as shown in Fig. 11. To adjust the orifice in accordance with movements of piston 159 and rack 150, shaft 255 is connected by lever 257, turnbuckle link 258 and a screw 259 with the disc 148. If rack 150 travels right from the position in Fig. 11 due to the application of pressure fluid upon the left end of piston 159, the oil discharged from the right end of the cylinder 160 will have the greatest restriction to its flow at the begining of right movement of a rack 150 and counterclockwise movement of pin 259. As these movements continue, the shaft 255 is rotated clockwise to increase the width of the orifice 256 to the maximum approximately at 90° travel of the table 125. As the table continues its movement in the same direction, the shaft 255 is moved to decrease the width of the orifice again, thereby decreasing the rate of travel of the piston 159 and rack 150. Thus the table comes gradually to rest at the end of its 180° movement.

In order that the table will be caused to move in either direction in the same manner as described, it is necessary to provide a valve capable of reversing connections between the ends of cylinder 160 and the fluid pressure force and between the ends of this cylinder and the return to a tank through the flow control valve 240. Fig. 34 shows diagrammatically a reversing valve 260 comprising a body 261 having a port 262 for connection with a fluid pressure source through a pipe u and having ports 263 and 264 connected respectively by pipes s and t with the opposite ends of cylinder 160 and having ports 265 and 266 connected by a pipe r with the inlet 244 of valve 240 whose outlet 245 is connected with a storage tank in a manner to be described. The ports of the body 261 are controlled by rotatable valve 267 of generally cylindrical formation which is provided with equi-distance notches 268 for the purpose of establishing the proper connection. These notches are spaced 90° and the portions referred to are spaced 45°. Therefore, when the valve 267 is in the position shown in full lines, u will be connected with s and t will be connected with r. Each time the valve 267 is turned 45° the connections will be reversed, for example, u will be connected with t and s will be connected with r. The turning of the valve 267 intermittently 45° each time is effected by mechanism shown in Figs. 19 and 20. A cylinder 270 containing a piston 270a (Fig. 34) is mounted on a suitable support 271. Piston 270a is connected with a rod 272 carrying a grooved collar 273 whose groove receives a pin 274 attached to a bar 275 slidable in bracket 276. At its left end, the bar 275 carries a pin 277 pivotally supporting a finger 278 urged clockwise by a spring 279 pushing on plunger 280 and causing the finger 278 to bear against the stop shoulder 281. When the piston 280 moves left, the finger 278 is adapted to engage a toothed disc 282 connected by screws 283 with an indicator 284 and connected to a shaft 285 which is integral with the valve member 267. Each time the piston 270a moves left at its full travel, the finger 278 engages a tooth of the disc 282 to cause the latter to move clockwise 45°. When piston 270a moves in the opposite direction, the disc 282 does not turn because the finger 278 engages a tooth end which moves the finger counterclockwise to move the pin 280 right and to compress the spring 279 until the finger leaves the tooth whereupon the spring returns the finger to its original position. During the right movement of the piston 270a, rotation of the disc 282 is prevented by a pawl 286 which engages a tooth of the wheel 282 as shown. Pawl 286 merely gravitates into retaining position in an installation where the supporting plate 271 is vertical. If that plate were mounted horizontally, it would be necessary to use a spring to urge the pawl 286 in the retaining position.

The molding material either in powder form or granular is placed in a hopper 300 (Fig. 5) from which it descends to a measuring device 310 capable of containing a predetermined quantity. After the device 310 is filled, it is caused to dump its contents into a hopper 360 which is closed at its top at a certain time and then compressed air is applied to blow the contents of the hopper 360 through a pipe 378 to a heating chamber 380 through which ascends the combustion products and hot air from a stove 400. While the thermoclone 380 is connected with the stove 400, a current of hot air from the stove ascends and causes the particles of molding powder to be suspended and to be heated a certain amount so that there is started a chemical reaction which is completed after the heated material is received by the cavities of the upper and lower dies. After the heating cycle, the thermoclone 380 is moved into alignment with a telescopic discharge pipe 417 which is lowered at the proper time as to discharge the contents of the thermoclone into a lower die when in the loading position. The foregoing is a brief outline of the method of handling the molding material before it is loaded into a lower die.

Referring to Figs. 21 and 24, it will be seen that the loading hopper 300 has a flange 301 by which it is attached by screws 302 to a plate 303 having a downwardly flaring opening 304. Plate 303 is pivotally supported by stud 305 upon the frame 311 of the measuring device 310. As shown in Fig. 23, plate 303 has a notch 306 for receiving a stud 307 which receives a nut 308 and a washer 309. By loosening the nut 305a on stud 305 and the nut 308 on the stud 306, the hopper and its mounting can be swung horizontally away from the opening 312 in the frame 311. Thus the hopper 300 can be moved so as to provide access into the interior of the frame 311 without lifting the hopper from the frame.

Frame 311 rotatably supports a measuring tube 313 (Fig. 24) having an oblong opening 314, through which molding powder can descend from the hopper through the passages 304 and 312. The amount of powder which the tube 313 receives depends upon the spacing between a fixed disc 315 and a movable disc 316. Disc 316 is integral with a rod 317 integral with a disc 318. A tube 319 which is slidable within the tube 313 is attached to the discs 316 and 318. Screws 320 connect the disc 318 with a disc 321 which is recessed to receive, with a running fit, the flanged head 322 of a screw 323 having a turn knob 324. Screw 323 is threaded through hub 325 of a disc 326 with screws 327 attached to a ring 328 surrounding the tube 313. By tightening the screws 327, the disc 328 is caused to move toward the disc 326 until the former engages a split wire snap ring 329 located in a groove provided by the tube 313. The hub 325 of disc 326 is journalled in a ball bearing 330 supported by a cover plate 331 which screws 332 attach to the frame 311 together with a cover plate 333. The location of the hub 325 relative to the bearing 330 is fixed by nuts 334 and 335 threaded on the hub 325, nut 334 being engageable with the inner race of bearing 330. By turning the knob 324, the screw 323 is threaded in and out of the hub 325 and the tube 319 and the disc 316 are caused to move horizontally in order to cause the tube 313 to receive a predetermined amount of molding powder. Fig. 24 shows the disc 316 in the position in which the tube 313 will receive the maximum measured amount of molding material. The screw 323 is held in a desired position of adjustment by a nut 336 which can be tightened against the right end of the hub 325 of disc 326 and which can be held in adjusted position by a lock nut 337. Nuts 336 and 337 have annular flanges which abut each other when these nuts are in engagement. The nuts can be turned by a spanner ring engageable with holes 337a or 336a in the flanges of these nuts.

The disc 315 which supports the left end of the tube 313 is integral with a shaft 340 journalled in a bearing 341 supported by a block 342 with screws 343 together with a plate 344 attached to the frame 311. Block 343 receives a gear 345 connected with the shaft 340. As shown in Fig. 22, gear 345 meshes with a rack 346 guided for vertical movement by the block 343 and attached to a rod 347 connected with a piston 350a (Fig. 18) in a cylinder 350. Cylinder 350 is attached to a frame 348 which supports the frame 311. Rod 347 is connected also with a block 351 carrying a roller 352 for engaging a cam lever 353 pivotally supported at 354 by the frame 311 and urged clockwise by a spring 355 received by a block 356 attached by screws 357 to the frame 311. Spring 355 urges downwardly a plunger 358, thereby causing the lever 353 to be urged against the roller 352. Movement of the lever 353 controls the opening and closing of a valve 359 (Fig. 24) in the mouth of the hopper 360. Hopper 360 has a flange 361 which is screwed to the frame 311. Screws 362 attach to the hopper a mouthpiece 363 providing a seat for the valve 359 which has a stem 364 connected by a pin 365 with a lever 366 attached to a shaft 367 journalled in a tube 368 (Fig. 26) welded to the hopper 360. Shaft 367 carries an arm 369 which as shown in Fig. 21, is connected by pin 370, link 371 and pin 372 with lever 353.

When piston 350a (Fig. 22) moves down tube 313 is rotated 180°. During such movement, the valve 359 is moved down so that the contents of the tube is discharged into the hopper 360. As it discharges, some of it may fall over the knife edge 366a of the lever 366. After the tube 313 has been discharged, the piston 350a moves up so as to return the tube 313 to position for receiving more powder from the hopper 300 and so as to move the valve 359 in mouth-closing position. The rotation of the tube 313 is limited by the engagement of a lug 315a (Fig. 25) of disc 315 with either of two stop screws 315b threaded into the frame 311 and retained in adjusted position by lock nuts 315c.

Pipe 477, connected with a compressed air source through a valve 471 (Fig. 18) may be connected by a two-way valve 477a either with pipe 377a or with pipe 377b leading into the hopper 360. Some kinds of material are discharged from the hopper 360 when compressed air is directed upon it, and other kinds when the air is introduced near the outlet, which is connected by a coupling 378a with the pipe 378. Any dust laden air escaping past the valve 359 is discharged through pipe 376 to a dust collector 375, the bottom of which may be connected with a bag not shown.

Referring to Fig. 27, thermoclone 380 is provided with a fixed baffle 381 and an adjustable baffle 382 of conical formation suspended by a rod 383 threaded through a plug 384 supported by rods 385 extending through clamps 386 which pins 387 attach together with the baffle 381 to the thermoclone 380. At its lower end, the thermoclone is welded to a flange 388, which screws 389 attach to a slidable plate 390 which, as shown in Fig. 32, is connected with horizontally movable side plates 391 having lugs 392 received by grooves 393 in a bar 394 which screws 395 attached to a spacer plate 396 and to a bracket 397 which includes a vertical plate 398 (Fig. 30) attached to another vertical plate 399 which is attached to the bar 109 which supports the die closing cylinder 110 (Fig. 2). Plate 398 supports the stove 400 into which there is introduced at 401 under pressure a combustible gas, combustion being supported by air previously mixed with the gas. Additional air to furnish necessary air volume is introduced through a side port in the stove. 402 is a window through which the flame is observed. The products of combustion together with the heated air pass through a curved pipe 403 attached to a flange 404 screwed to the bar 394 and through a connecting sleeve 405 and through an apertured plate 406 and upwardly through the thermoclone 380. As the molding material is blown through the pipe 378 into the hopper, it is caught up by the rising currents of hot air and combustion products and is caused to be heated to such extent that there is initiated chemical reaction further carried on in the die cavities where, under pressure as well as heat, the curing of the resin is completed.

After the preheating cycle in the thermoclone 380 has been completed, the thermoclone is moved bodily to the left from the position shown in Figs. 1 and 27 by means including a cylinder 410 having a piston 410a (Fig. 18) connected with a rod 411 which a plate 412 swivelledly connects it to a plate 413 which is connected with the plates 390 and 391 (Fig. 32). At the proper time, the piston 410a is caused to move left to move the lower end of the thermoclone away from the stove outlet 403 and into communication with a funnel-like opening 415 in bar 394 whence the contents of the thermoclone are discharged by gravity into the open die at the loading station through a telescopic tube comprising members 416 and 417 which are caused to be extended while the contents of the thermoclone 380 is being discharged. The upper end of tube 416 is attached to a flange 418 attached to the under side of bar 394. The tube 417 is attached to a plate 419 (Fig. 29) attached to a bracket 420 caused by screws 421 to be clamped around a tube 422. Tube 422 telescopically engages a tube 423 attached at its upper end to a bracket 424 attached as shown in Fig. 28 to the plates 399 and 109. Tube 423 has a side slot 425 for receiving a lug 426 (Fig. 31) integral with a plate 427 which screws 428 attach to a ring 429 attached to the tube 422. The tube 417 is supported upon a flange 430 of a rod 431 attached to the rod 432 of a piston 440a (Fig. 18) received by a cylinder 440 which is supported by the bracket 424. Piston 440a can move down until it bottoms in cylinder 400. The discharge tube 417 is lowered when the time comes to fill a lower die. After the die has been filled, compressed air is caused to enter the lower end of the cylinder 440 in order to raise rod 432, flange 430, lug 426, bracket 429, tube 422 and tube 417. It is desirable that the tube 417 be up while unloading the work from the die at the loading station and preparing it from the reception of a charge of preheated molding material.

The control of the mechanism for handling the molding powder is illustrated diagrammatically in Fig. 18. The admission of pressure fluid (compressed air) to the ends of cylinders 350, 410 and 440 is controlled by a valve unit 441 which includes a movable valve 442 for controlling the distribution of pressure fluid entering through a pipe 443 and an inlet port 444 to either of distribution ports 445 and 446 connected respectively with pipes 447 and 448. Pipe 447 is connected with the lower end of cylinder 350 with the left end of cylinder 410 and with the lower end of cylinder 440. Therefore when the valve 442 is in the position shown, piston 350a will be forced up, piston 410a will be forced right and piston 440a will be forced up. Pipe 448 is connected with the upper ends of cylinders 350 and 440 and through a restriction 449 with the right end of cylinder 410. When valve 442 is caused to move down, the right end of cylinder 410 and the upper ends of the cylinders 350 and 440 are connected with the pressure pipe 443 which results in the left movement of piston 410a and downward movement of pistons 350a and 440a. The restriction 449 provides for downward movement of piston 440a ahead of left movement of piston 410a. Therefore the discharge tube 417 is lowered ahead of movement of the thermoclone 380 over the discharge outlet 415. The valve 441 provides exhaust ports 450 and 451 which are so controlled that when pressure fluid is applied to one end of each of the cylinders 350, 410 and 440, the other ends will be connected with exhaust or with drain in case hydraulic pressure is used. Valve 442 carries a roller 453 for engaging a control cam 454 against which the roller is urged by a spring 455. Cam 454 effects the dumping of the contents of the measuring device into the hopper 360 and the closing of the measuring device and return of the measuring device to position for receiving another charge while effecting the movements for discharge of the thermoclone and its return to the stove.

While the hopper 360 is closed at the top, compressed air is caused to pass from pipe 443 and through valve unit 471 and pipe 477 into the hopper to force the molding material into the thermoclone. Unit 471 has a movable valve 472 carrying a roller which a spring 475 urges against a cam 474 which depresses the valve member 472 after valve member 442 rises.

Cams 454 and 474 are rotated counterclockwise by a shaft 480 which carries switch-operating cams 481 and 482 which, respectively, are engaged by rollers 483 and 484 carried respectively by plungers 485 and 486 slidable in switch units 487 and 488 respectively and urged upwardly by springs not shown. Units 487 and 488 contain switches S2 and S3, respectively, having functions to be described in connection with Fig. 33. Shaft 480 is connected by spur gears 490 and 491 and by worm gear 492 and worm 493 with a cam shaft operating motor M3.

The motor M3, the cams driven thereby and the switches and valves controlled by the cams are combined in a unitary structure shown in Fig. 14. It may be desirable to adjust or replace the cams without disassembling the unit in order to adapt the machine and apparatus for the molding of a particular work piece. The timing of the material handling apparatus may depend on the quantity of the charge for each molding operation. Cam 454 comprises two segments 456 and 457 (Figs. 14 and 16). Screws 458 pass through holes in segment 457, through an arcuate slot 459 in segment 457 and are threaded into a plate 460 integral with a hub 461 surrounding shaft 480 and integral with a plate 462 provided with an arcuate slot 463 (Fig. 15). Screws 464 pass through slot 463 and are threaded into a segment 465 which provides the cam 481. This construction provides for the angular adjustment of the cams 454 and 481 relative to the hub 461 and for the adjustment of the width of the lobe of cam 454. The hub 461 is adjustable relative to the shaft 480 by providing the hub with slots 466 which receive screws 467 which pass through a clamp plate 468 and are threaded into the shaft 480.

Cam 474 is provided by two segments 474a and 474b which may be angularly displaced to provide adjustment of the width of the lobe of the cam. Screws 475 pass through an arcuate slot 476 in segment 474b and are threaded into the segment 474a. Segment 474b has a half-shell hub 477 which together with a half-shell hub 478 embraces the shaft 480. Screws 479 attach a binding ring 479a and the two half-shell hubs to the shaft 480. This construction provides for adjustment of the width of the lobe of cam 474 and for its removal from the shaft 480 without removing the shaft from its bearings 480a.

Cam 482 is provided by segments 482a and 482b having half-shell hubs which are attached to shaft 480 in the same manner as the half-shell hubs 477 and 478 of cam 474 are attached to the shaft 480. Cam 482 may be removed from shaft 480 without removing the shaft from its bearings.

Referring to Fig. 33, the electric current for heating the dies is obtained from a three-phase A. C. source connected with three circuits shown in the right hand portion of this figure by lines of three styles, namely: (1) heavy solid lines, (2) heavy dash lines, (3) heavy dotted lines. These circuits include wires 1, 2 and 3 which a three pole switch A connects them with wires 1a, 2a and 3a. An electromagnetic switch B provides contacts 1', 2' and 3' for connecting wires 1a, 2a and 3a, respectively, with wires 1b, 2b and 3b respectively. Switch B includes a magnetic coil b for attracting an armature b1 against the action of a spring b2, said armature being insulatingly connected with contacts 1', 2' and 3', and also a contact 4' for connecting wires 5 and 8. Magnet coil b receives energizing current from secondary s1 of a transformer TR1, whose primary p1 is connected with wires 1a and 2a.

The control of current flow from secondary s1 to magnet coil b is effected by a start-stop switch SS1, having a normally open switch contact 7 for connecting wires 6 and 5 with wire 8 and a normally closed contact 10 for connecting wires 8 and 9. When start contact 7 is moved left to connect wires 5 and 6 with wires 8, coil b is connected with secondary s1 to a circuit which includes wire 4, coil b, wire 5, contact 7, wire 8, contact 10 and wire 9. Coil b being energized, the armature b1 moves right to cause movement of contacts 1', 2', 3' and 4', which respectively connect wires 1a and 1b, 2a and 2b, 3a and 3b, and wires 5 and 8. Wires 5 and 8, being connected by contact 4', contact 7 can be released and the circuit between secondary s1 and coil b remains since contact 4' connects wires 5 and 8 which initially has been connected by contact 7. When current is flowing in coil b, indicator lamp 6a burns to indicate that switch B is closed.

Secondary s1 of transformer TR1 supplies current to magnet coils 1e, 2e and 3e, one end of each of these coils being connected with wire 4. The other ends of coils 1e, 2e and 3e are connected respectively by thermal switches 1t, 2t and 3t with wire 5, which is connected by contact 4' of switch B with wire 8 connected by normally closed contact 10 with wire 9 connected with secondary s1. So long as thermal switches 1t, 2t and 3t remain closed, coils 1e, 2e and 3e are energized by the circuit described and such energization is indicated by the burning of lamps 1f, 2f and 3f, respectively. When said coils are energized contacts 1c, 2c and 3c respectively connect wires 1b, 2b and 3b with wires 1d, 2d and 3d. Then the following circuits to heater units are established: (1) wire 1d to units $h_1$, $h_2$, $h_3$, $h_4$ and wire 1b to $h_5$, $h_7$, $h_8$, $h_{11}$, (2) wire 2b to units $h_1$, $h_3$, $h_6$, $h_{12}$, and wire 2d to units $h_7$, $h_8$, $h_9$, $h_{10}$, (3) wire 3b to units $h_2$, $h_4$, $h_9$, $h_{10}$ and wire 3d to units $h_5$, $h_6$, $h_{11}$, $h_{12}$. The load across the wires 1, 2 and 3 is thus substantially equally distributed. Each heater unit receives full voltage and current. The three dies are heated, respectively, by three groups of units namely: $h_1$, $h_2$, $h_3$, $h_4$ and $h_7$, $h_8$, $h_9$, $h_{10}$ and $h_5$, $h_6$, $h_{11}$, $h_{12}$. The thermal switches 1t, 2t and 3t are located respectively in heat receiving relation to the dies which are provided with holes for receiving the heating units and the thermal switches. When a certain temperature of a die is reached, the thermal switch associated with the die will open and thereby effect the opening of one of the heat circuits so that the heater units of that die will receive one-half the voltage and current that formerly passed and the heating effects of those units will be one-fourth of that which existed before the associated thermal switch opened. For example, with regard to the group of heater units $h_1$, $h_2$, $h_3$, $h_4$ controlled by thermal switch 1t, before switch 1t opens, units $h_1$ and $h_3$ are connected between wires 1 and 2, and units $h_2$ and $h_4$ are connected between wires 1 and 3. When switch 1t opens, relay magnet coil 1e is deenergized, spring 1g moves contact 1c into open position, and the units are disconnected from wire 1. Units $h_1$ and $h_2$ and units $h_3$ and $h_4$, in series groups, are connected across wires 2 and 3.

Thermal switches 2t and 3t operate in a similar manner to control the other groups of heater units. In consequence of the foregoing, the die temperature increases rapidly until a desired temperature is reached; and, thereafter, that temperature is maintained with the use of half as much current. For example, full current may be used only during 30% of the time operation of the molding press. This percentage varies according to quantity of molding powder in the die cavities. Sparking at contacts of the thermal switches $1t$, $2t$ and $3t$ is reduced by condensers $C_1$, $C_2$ and $C_3$, respectively.

The current for operating certain electric motors of the system may be supplied by line wires 11, 12 and 13 (three-phase A. C.) which may be at a voltage differing from line wires 1, 2 and 3. A three pole switch C connects wires 11, 12 and 13 respectively with wires 11a, 12a and 13a. An electromagnetic switch D provides contacts 11', 12' and 13' for connecting 11a, 12a and 13a with wires 11b, 12b and 13b and a contact 14' for a purpose to be described. Switch D has a magnet coil $d$ for effecting the action of armature $d1$ against the action of spring $d2$.

Wires 21, 22 and 23 leading to electromagnetic switch E are connected respectively with wires 11a, 12a and 13a. Switch E provides contacts 21', 22', and 23' for connecting wires 21, 22 and 23 with wires 21a, 22a and 23a. Switch E has a magnet coil $e$ for effecting the attraction of an armature $e1$ against the action of a spring $e2$. Armature $e1$ is connected with contacts 21', 22' and 23' and also contact 24' for connecting wires 14 and 20 for a purpose to be described.

Magnet coil $d$ of switch D and magnet coil $e$ of switch E are energized by current received from secondary $s1$ of transformer TR1. The control of the connections between coils $e$ and $d$ and secondary $s1$ is effected by start-stop switch SS2 having a normally closed contact 19 connecting wires 18 and 20 and a normally open contact 25 for connecting wires 20 and 26. The circuit which is established when switch 25 is closed is as follows: secondary $s1$, wire 4, wire 28 leading to each of coils $e$ and $d$, wire 27 leading from each of the coils $e$ and $d$, wire 20, contact 19, wire 18, thermal switch $33t$, thermal switch $31t$, wire 17, thermal switch $11t$, thermal switch $13t$, wire 16, thermal switch $21t$, thermal switch $23t$, wire 15, wire 9. When coils $d$ and $e$ are energized by the closing of the switch 25, the armatures $d1$ and $e1$ move right thereby causing right movements of the contacts of switch D and switch E for the purpose of connecting wires 11b, 12b and 13b with line wires 11, 12 and 13 and for the purpose of connecting wires 21a, 22a and 23a with line wires 11, 12 and 13 and for the purpose of connecting wire 27 with wire 14 and wire 14 with wire 20. Then the switch 25 may be released, and the coils $e$ and $d$ remain connected with transformer secondary $s1$ through the following circuit: secondary $s1$, wire 4, wire 28, to which each of the coils $e$ and $d$ is connected, wire 27, wire 14, wire 20, contact 19, wire 18, thermal switches $33t$ and $31t$, wire 17, thermal switches $11t$ and $13t$, wire 10, thermal switches $21t$ and $23t$, wire 15 and wire 9. Switches E and D open automatically when the stop switch contact 19 is opened.

Wires 11b, 12b and 13b supply the current of motor M1 for operating pump P1 (Fig. 34). Wires 11b and 13b include heater units 11c and 13c, respectively, for heating thermal switch $11t$ and $13t$, respectively. Wires 21a, 22a and 23a supply current for motor M2 which drives pump P2 (Fig. 34). Wires 21a and 23a include heater units 21b and 23b, respectively, for heating thermal switches $21t$ and $23t$, respectively. Secondary 52 of transformer TR2 (energized by lines 11 and 12) is connected with wires 41 and 51 which a magnetic switch F connects with wires 31 and 33 connected with a single phase motor M3 known as the cam shaft motor. The contacts of switch F are closed by the energization of a magnet coil $f1$ which attracts an armature $f2$ against the resistance of a spring $f3$ which opens switch F when the coil $f1$ is deenergized. Wires 31 and 33 include heater units 31a and 33a, respectively, for heating thermal switches $31t$ and $33t$, respectively. When either of the motors M1, M2 or M3 becomes overloaded one or more of these thermal switches will open. Since they are all connected in series with the contact 19 of the start-stop switch SS2 and with wire 9 connected with transformer secondary $s1$, both of the magnet coils $d$ and $e$ will be deenergized and both of the switches E and D will open and the pump motors and the cam shaft motor will stop.

There are certain controls for the machine which are electrically operated. For this purpose, there is provided a transformer TR2 having a primary $p2$ connected with wires 11b and 12b and having a secondary $s2$ connected with wires 41 and 51. In order to facilitate tracing the circuits from these wires, wire 41 and its branches are indicated by heavy long dash lines and wire 51 and its branches are indicated by heavy short-dash or dotted lines. There is an electromagnetic switch G having a magnet coil $g$ which when energized, effects the attraction of armature $g1$ against the action of a spring $g2$ in order to effect the bridging of contacts 42 and 43 by a contact 42', the bridging of contacts 65 and 66 by a contact 65', the bridging of contacts 52 and 53 by a contact 52' and the bridging of contacts 54 and 55 by a contact 54'. Coil $g$ is electrically connected with transformer secondary $s2$ by the movement of contact 58 of start-stop switch SS3 into closed position to connect contacts 54 and 55 of switch G. This effects energization of coil $g$ through the following circuit: wire 41, coil $g$, wire 57, normally closed contact 56 of switch SS3, contact 58, contact 54 and wire 51. After contact 54' bridges contacts 54 and 55, contact 58 may be released. Switch G is caused to open by moving contact 56 of switch SS3 into open position. While coil $g$ is energized to close switch G, lamp $g3$ connected between wires 41 and 57 will burn to indicate that switch G is closed.

When switch G is closed and provided switch 63 is closed to connect wires 64 and 59, magnet coil $f1$ of switch F will be energized and cam shaft motor M3 will operate provided switches C, D and F are closed. The circuit of the coil $f1$ is as follows: wire 41, contact 42, contact 42', contact 43, wire 44, coil $f3$, wire 64, switch S3 (63), wire 59, contact 53, contact 52', contact 52 and wire 51. In the normal operation, motor M3 is stopped by the opening of switch S3 which is effected by a cam 482 driven by motor M3. When switch G is closed and provided switch 48 associated with a synchronous motor M4 is closed, said motor is connected with secondary $s2$ in the following manner: wire 41, contacts 42, 42', 43, wire 44, motor M4 through switch 48 and thence to wire 51.

There is a safety solenoid magnet coil J which when energized permits the hydraulic system of the machine to function in the usual manner. Coil J is connected with secondary $s2$ through a circuit which includes wire 41, contacts 42, 42' and 43, wire 44, switch S1 (when at 45a engaging contact 45), wire 47, coil J, wire 51.

There is a cycle-counter-operating coil K which parallels the coil $f1$ of switch F. Each time switch F closes, the counter operated by coil K adds one.

The switch S4 is provided for the purpose of making sure that the table has indexed before the upper mold descends. Switch S4 is located at $51a$ during the indexing or rotating of the table and is located at $51a'$ while the table is at rest and the material in the dies is curing. Switch S4 is mounted on a bracket $102a$ (Fig. 10) supported by post 102 and it has an actuating plunger 601 carrying a roller 602 for engagement by either of two cams 603 attached to the table at diametrically opposite locations. In either at rest position of table 125, a cam 603 engages roller 602 to move plunger 601 left so as to cause switch S4 to move to $51a'$ (Fig. 33). During indexing of the table 125, roller 602 is not engaged by a surface 605, so that a spring (not shown) of switch S4 causes it to move to $51a$ (Fig. 33).

There is a die controlling solenoid magnet coil L which is connected in the following manner with secondary $s2$: Wire 41, contacts 42, 42' and 43, wire 44, magnet coil L, wire 62, contact 61 of switch H, bridging contact 60', contact 60, wire 69, contacts 53, 52' and 52 and wire 51. Contacts 60 and 61 will be bridged by contact 60' provided magnet coil $h$ of switch H is energized so as to attract armature $h1$ against the force of spring $h2$. Coil $h$, of switch H, is connected with secondary $s2$ through the following circuit: Wire 41, coil $h$, wire 73, wire 74, switch S5 when in position 68', wire 69, wire 75, switch S4 in position $51a'$, wire 51. When coil $h$ is energized, it will effect also the bridging of contacts 71 and 72 by contact 71'. Therefore, switch S5 may return from position 68' to position 68. The circuit of coil $h$ will then be wire 41, coil $h$, wire 73, contacts 72, 71' and 71, switch S2 (70), wire 69, wire 75 in switch S4 in position $51a'$, and wire 51.

There is a timer T which includes the synchronous electric motor M4 which rotates continuously so long as switch 48 (Fig. 33) is closed. Fig. 59, on the same sheet with Figs. 14–17, shows a diagram of the timer. Motor M4 drives a shaft 803 through a speed reduction gearing represented by worm 801 and worm gear 802. Splines 804 of shaft 803 provide a slidable connection with a friction clutch disc 805 engaged with a clutch disc 806, by a spring 807. Shaft 808 connected with disc 806 moves clockwise a lever 809 urged toward an adjustable stop 810 by a spring 811 attached to the lever 809 and to a fixed support. After a predetermined time represented by a predetermined number of revolutions of motor M4, lever 809 engages switch S5 to interrupt its connection with wire 74 and to cause it to make a connection with wire 67 for purpose of starting the motor M3. When lever 809 engages the switch S5, it opens the normally closed switch 48 (Fig. 33) which causes motor M4 to stop. The timer has "timed-out." The timer is reset by causing switch S4 to move to position $51a$ which effects energization of electromagnet $c4$ which separates disc 805 from disc 806 thereby permitting spring 811 to rotate lever 809 counterclockwise until it engages the stop 810. As lever 809 moves back to the stop 810, switch 48 closes and motor M4 starts. When electromagnet $c4$ is deenergized by return of switch S4 to position $51a'$, spring 807 moves the disc 805 into engagement with disc 806 and the timer starts to time by moving lever 809 clockwise. The duration of timing is varied by changing the angular position of stop 810 relative to shaft 808. While motor M4 is timing, switch S5 is at 68'. Therefore solenoid L is energized and the upper die remains down upon a lower die. When the timer "times-out," switch S5 (at 68' during curing) is moved by the lever 809 to position 68 (Fig. 33) thereby in conjunction with switch S4 at $51a'$, completing a circuit by-passing switch S3 and causing motor M3 to start. After a certain interval, motor M3 opens switch S2 so that coil $h$ of switch H is deenergized and coil L is deenergized. The upper die rises and indexing of the table 125 begins as a result of the operation of a hydraulic control to be described. During indexing, switch S4 is at $51a$, coil $c4$ is energized, and the timer is reset. At the end of indexing, switch S4 returns to $51a'$, coil $c4$ is deenergized, and the timer starts timing. Resetting the timer T causes switch S5 to return to 68'; but the cam shaft motor M3 continues to run because, before switch S5 returns to 68', the motor M3 has operated to close switch S3 (at 63), said switch having previously been left open by operation motor M3 in order to stop itself at the end of its cycle of operation.

The starting of the cycle may, for purposes of explanation, be considered to be when one of the lower dies is in the loading position and the other is in position for curing and the timer T is operating to time the cure. Curing is taking place with the upper die down and the lowering of the upper die is effected by the energization of solenoid L. Solenoid L becomes energized by movement of the switch S4 to $51a'$, which causes directly the connection of coil $h$ of switch H to become energized. Switch H closes and the circuit of solenoid L is energized.

While the molding material is being cured, the timer motor M4 is timing out. When motor M4 times-out or operates for a predetermined time, it automatically causes switch S5 to move to 68. The cam shaft motor M3 starts operating although since switch S3 (left open when motor M3 stopped) is by-passed by switch S5. During operation of motor M3, the cam shaft 180 operated thereby causes a measured charge to be transferred from hopper 360 through pipe 378 to the thermoclone 380 which is then located in communication with the stove 400. Hopper 360 is caused to receive a succeeding measured charge. After a lapse of time required to heat the charge in the thermoclone, the discharge tube 416, 417 is extended and the thermoclone 380 is shifted from the burner to the upper end of the discharge tube and the heated material is discharged into the lower die then in loading position. Then switch S2 is opened by cam 481 operated by motor M3 and the circuit of coil $h$ is interrupted because the switch S5, which was at 68', while the timer was timing out, has gone to 68 at the end of the timing operation. When coil $h$ is deenergized, switch H opens and solenoid L is deenergized and the upper die rises in accordance with the operation of the hydraulic system to be described.

When the upper die rises, piston $270a$ of cylinder 270 moves right to cause valve 260 to reverse the connections of cylinder 160 and indexing starts. Motor M3 opens switch S3 and motor M3 stops with switch S3 open. During indexing, the switch S4, which was at $51a'$ during curing, moves to $51a$ to cause the timer to be reset by energizing coil $c4$, which causes the disengagement of the timer clutch 805, 806; and the spring 811 turns the lever 809 back to start position against the stop 810. As lever 809 leaves switch S5, the latter moves to 68', thereby closing a part of the circuit of coil $h$ of switch H which is not yet completed because switch S4 is still at 51a'.

At the end of the indexing movement, switch S4 moves 51a' which causes coil c4 of the timer to become deenergized whereby timer clutch 805, 806 is reengaged by spring 807 and the timer M4 drives shaft 808 again to time the curing cycle. Movement of S4 to 51a' also causes coil $h$ of switch H to be energized and the coil L is energized. Upper die 121 descends upon a lower die, the molding material is injected into the die cavities and curing continues.

Fig. 18 shows the status of the apparatus operated by motor M3 at the end of its cycle when cam 484 opens switch S3. When switch S3 is by-passed by switch S5 (Fig. 33) at 68 when the timer "times-out," motor M3 starts rotating shaft 480 counter-clockwise (Fig. 18). Cam 474 immediately lowers valve 472 to cause the measured charge in hopper 360 to be transferred to the thermoclone. After about 270° rotation of shaft 480 during which the charge is heated, cam 454 lowers valve 442 to cause the thermoclone to discharge its contents into a die at the loading station. Immediately following complete downward movement of valve 442, cam 481 opens switch S2 in consequence of which the upper die rises and indexing starts. Sufficient time is allowed for discharge of the thermoclone before indexing starts although it appears that descent of roller 483 follows immediately the descent of roller 453. Indexing does not take place the instant switch S2 is opened by cam 481, but an appreciable time thereafter due to time required for the relay switch H to open following interruption of the circuit of its coil $h$ and the time required for valve 510 to return to the status shown in Fig. 37 after the circuit of solenoid L is interrupted and the time required for the ram piston 190a to move down and the time required for upper die piston 110a to move up and the time which elapses thereafter before indexing takes place. While these separate time intervals are small, they total an appreciable amount. Since it is desirable that the time interval between discharge of the thermoclone and indexing the conveyor table be no longer than necessary for the discharge of heated material from the thermoclone, the timing of cams 454 and 481 is adjusted for this purpose by the means shown in Figs. 14 and 16. The effective width of the high lands of cams 474 and 454 is varied according to the quantity of the charge.

The cycle is repeated automatically and then stopped manually by pressing the off button 56 of start-stop switch SS3. This cycle can be started again from where it left off by pressing the on button 58 of switch SS3. After the cycle has been stopped by depressing the off button 56 of switch SS3, the upper die can be caused to move up by moving the switch S1 normally at 45a to position 45a'. This will cause the safety solenoid J to be energized so that the hydraulic system can operate to move the die 121 up. If the switch S1 at 45a' is released so that it returns by a spring to the position 45a, the solenoid J will be deenergized but nothing will happen until button 58 of switch SS3 is pressed to start the machine. The control cycle will be resumed by pressing the on button 58 of start-stop switch SS3.

In Figs. 34 through 50 which illustrate the hydraulic system, reference letter T refers in each case, to a return pipe leading to an oil tank from which the pumps P1 and P2 withdraw oil and force it through the system. Before the operation of the hydraulic system is described, there follows a description of certain valve units not previously described.

Valve 500 (Figs. 35 and 36) comprises a movable valve 501 which, as shown in Fig. 35, normally blocks the connection between pipes $a$ and $b$. Then the pump P1 cannot force liquid through the pipe $a$. A pressure relief unit $aa$, associated with the pump, then operates to relieve the loading of the pump. The pump has a high pressure stage and a low pressure stage. While the valve 500 is closed, a relief valve in unit $aa$ opens at a certain pressure to relieve the high pressure stage. Another relief valve opens to reduce the low pressure stage to a very low value. The pumped liquid which cannot flow through the pipe $a$ returns to the tank through a pipe $pt$ having a restriction sufficient to produce about 50# back pressure which is sufficient to cause some of the liquid to be forced through a heat exchanger and a filter. As shown in Fig. 36, valve 501 has moved left to connect pipe $a$ with pipe $b$. This is effected by pressure oil entering through $a'$ when valve 504 shown up in Fig. 35, moves down into the position shown in Fig. 36. Downward movement of valve 504 against the action of a spring 503 is effected by downward movement of an armature 502 when solenoid coil J is energized. Coil J is the emergency solenoid. It is normally energized after start button 58 of switch SS3 has been closed. J is deenergized by opening 56 of switch SS3. It is temporarily energized by moving switch S1 from position 45a (Fig. 33) to position 45a', in order to cause the upper to rise while the machine has stopped.

Figs. 37 and 38 show a valve unit 510 having a movable valve 511 which, as shown in Fig. 37, connects $b$ with $f$ but blocks connection between $b$ and $c$ which is connected with T. In Fig. 38, $f$ is blocked from $b$ and is connected with T, and $b$ is connected with $c$. Movement of valve 511 into the position shown in Fig. 38, is effected by oil pressure entering pipe $v$ (connected with $a'$, Fig. 34) when a valve 512 moves down to the position shown in Fig. 38. This movement is effected against the action of spring 513 by downward movement of an armature 514 when a solenoid coil L is energized. This coil is energized automatically following the indexing operation. The connection between pipe $a'$ and pipe $v$ is controlled by a safety valve unit 591 which, as shown in Fig. 38, has a movable valve member 592 urged right by a spring 593 to cause a roller 594 carried by the valve to be received by either of two diametrically opposite notches 595 in a ring 596 which rotates with the conveyor table. While the table is being indexed, pipe $v$ will be connected with drain T. At the end of the indexing of the table, pipe $v$ is connected with pipe $a'$. Therefore valve unit 591 makes it certain that the valve member 511 of unit 510 will not move to the position shown in Fig. 38 until indexing has been completed. Ring 596 is attached to the table hub 126 as shown in Fig. 10.

Figs. 39 and 40 show a valve unit 520. In Fig. 39 movable valve element 521 is in position for blocking pipe $j$, from $c$ and $d$ which are always connected through the unit 520. In Fig. 40, valve 521 has moved into position for connecting $c$ and $d$ and also with $j$. Movement of valve 521 into the position shown in Fig. 40 against the action of a spring 524 (adjusted by screw 525) is effected by pressure oil entering the pipe $x$ when the pressure in $x$ builds up to a value such as to overcome the spring 524, check valve 522 permits flow from $j$ to $c$. Valve 520 responds to pressure above the clamp piston 110a after it has lowered to cause the ram piston 190a to rise.

Figs. 41 and 42 show a valve unit 530 having a movable valve 531 held down in Fig. 41 by spring 534 (adjusted by screw 535) and movable up into the position shown in Fig. 42 by oil under pressure entering pipe $y$ when said pressure has attained a value such as to overcome the spring 534. In Fig. 41 valve 530 blocks flow from $e$ (also $w$ and $x$) to $d$. Flow from $d$ to $e$ is permitted by check valve 532. In Fig. 42, valve 531 is located to permit flow from $e$ to $d$. Valve 530 responds to pressure above ram piston 190a after it has lowered to open $e$ to drain so that clamp piston 110a can rise.

Fig. 43 shows a sequence valve 560 connected as shown in Fig. 44 between $g'$ and $g''$. There can be flow from $g''$ to $g'$ past check valve 562, but not from $g'$ to $g''$ unless valve 561 moves up from the position shown when the pressure in $g'$ is great enough to raise piston 563 and valve 561 against the action of spring 564, adjusted by screw 565.

Figs. 44 and 45 show a valve unit 550 having a movable valve member 551 held in the position shown in Fig. 44 by a spring 552 and movable to the position shown in Fig. 45 by pressure oil entering from the pipe $g''$. When the valve 551 is in the position shown in Fig. 44, pipes $h$ and $g$ are connected together and pipe $q$ is connected with drain T. When valve 551 is in the position shown in Fig. 45, $h$ is connected with drain T and $g$ is connected with $q$. Valve 550, controlled by valve 560, responds to pressure underneath clamp piston 110a after it has risen, to relieve pressure above ram piston 190a and above ejection piston 200a and to cause the indexing of the table through the action of piston 270a which reverses valve 260.

Figs. 46 and 47 show a valve unit 570 having a valve member 561 held in upper position by a spring 572 but movable down into a position as shown in Fig. 47 by oil pressure entering pipe $k$. When valve 561 is located in the position shown in Fig. 46, $m$ is connected with $l$ and $o$ is connected with T. When valve 561 moves down to the position shown in Fig. 47, $l$ is connected with T and $m$ is connected with $o$. Valve 570 withholds connection of the upper end of ejection cylinder 200 with drain until the ram piston 190a has risen when pressure below the piston 190a causes valve 570 to connect pipes $m$ and $o$ so that the ejection piston 200a can be caused to rise when valve 580 is lifted by the pedal 575. After solenoid L is deenergized and valve 510 is conditioned as shown in Fig. 37 and before the clamp piston 110a has risen and before valve 550 is conditioned as shown in Fig. 45, pipe $k$ then having no pressure, valve 570 is conditioned as shown in Fig. 45; and, because pipe $h$ then has pressure and $l$ and $m$ are then connected by valve 570, ejection piston 200a will move down automatically independently of the release pedal 575 to permit valve 580 to lower, pipe $p$ then having no pressure when pipe $c$ is connected with drain by valve 510. Therefore, valve 570 provides for lowering the injection piston automatically before indexing takes place and before the thermoclone discharges material into the die at the loading station.

Figs. 48 and 49 show a valve unit 580 having a valve member 581 held down by a spring 583 as shown in Fig. 48 but movable to an upper position by a pedal 575 (Fig. 34) pivoted at 576 and engageable with a roller 582 attached to member 581. When valve 571 is down as shown in Fig. 48, $p$ is connected with $o$ and $n$ is connected with T. When valve 571 is up as shown in Fig. 49, pipe $o$ is connected with T and $n$ is connected with pipe $p$.

Fig. 50 shows a sequence valve unit 600 which normally blocks pipe 599 from T until the pressure in pipe $y$ is sufficient to raise a piston 603 and a valve member 601 against the action of a spring 604 adjusted by a screw 605.

The system will operate provided emergency solenoid J is energized so that valve 501 of unit 500 is in the position shown in Fig. 36 to connect pipes $a$ and $b$ so that pump P1 is connected by pipes $a$ and $b$ and by valve unit 510 when in the status shown in Fig. 37 with pipe $f$ in order to elevate piston 110a of clamp cylinder 110. As will be explained later, piston 110a does not start to rise until a pressure has been built up in pipes $f$ and $y$ sufficient to move valve 531 of unit 530 into the position shown in Fig. 42 so that the oil above piston 110a can escape from $e$, through valve 530 to $d$ and thence through valve unit 520 to pipe $c$ and thence through valve unit 510 to drain T. Piston 110a does not move up until after piston 190a of shot cylinder 190 moves down. Piston 190a moves down since pressure is delivered by pump P1 through $a$, unit 500, $b$, unit 510 in the status shown in Fig. 37, pipe $f$, pipe $g$, valve unit 550 when in the status shown in Fig. 44, pipe $h$. Oil escapes from the bottom of cylinder 190 through pipe $j$ past check valve 522 of unit 520, to $c$ and to T of unit 510 in the status shown in Fig. 37. It is after the shot cylinder piston 190a has moved down to the bottom cylinder 190 that pressure builds up in $h$, $g$, $f$ and $y$ to such extent that valve 531 of unit 530 can move up to the position as shown in Fig. 42 so that $e$ will be connected with $d$ and hence through unit 520 with $c$ and to T of unit 510, so that the piston 190a can move up.

Fig. 34 shows index piston 159 at the right end of its cylinder 160. The left end of the cylinder 160 receives pressure oil from pipe $b$ through pipe $u$ (including check valve $cv$) through reversing valve 260 and pipe $s$. The right end of the cylinder 160 is connected with drain through $t$, the reversing valve 260, pipe $r$, valves 240 and 595 which leads to a drain T through a sequence valve 600 provided the pressure in $y$ is sufficient.

Fig. 34 shows knock-out piston 200a at the bottom of its cylinder 200. Piston 200a has been moved to that position by oil pressure from pipe $c$, pipe $p$, valve 580 when in the status shown in Fig. 48, pipe $o$, valve 570 when in the status shown in Fig. 47 and pipe $m$. The lower end of the cylinder 200 is connected with drain through pipe $n$, valve unit 580 when in the status shown in Fig. 48, and drain T. After knock-out piston 200a had moved down, the pressure above the piston 200a above shot piston 190a is automatically relieved as the result of a movement of valve member 551 of unit 550 into the status shown in Fig. 45 as result of a pressure in pipe $g''$, which pressure builds up sufficiently after piston 110a of clamp cylinder 110 has arrived at the top of said cylinder. Then $h$ is connected with drain T of unit 550 (in status shown in Fig. 45) and there is no pressure above piston 190a as well as no pressure below it. The upper end of cylinder 200 is connected through $m$, valve unit 570 (in status shown in Fig. 46), $l$ and $h$. Therefore, there is no pressure above piston 200a as well as no pressure below it. Therefore the springs are able to relieve pressure at the couplings between the compression plungers of the dies and the shot piston and the knock-out piston. Therefore indexing can take place without frictional resistance due to these connections.

Assuming that clamp piston 110a has just risen to separate the dies as a result of deenergization of the solenoid L as a result of build-up of pressure in g'' following the stopping of piston 110a against the upper end of cylinder 110, valve 550 becomes conditioned as shown in Fig. 45 to connect g with q thereby causing piston 270a to move right from the position shown in Fig. 34 while the exhaust from the right end of the cylinder 270 drains out through p, unit 58 (as in Fig. 48) o, unit 570 (as in Fig. 46) T or to C and out through drain T of unit 510. This causes the reversing valve 260 to reverse thereby connecting u from b to pipe T which causes piston 159 to move left while the left end of cylinder 160 is connected through drain to pipe s, r and valve units 240 and line 599 and valve 600 to drain. Movement of piston 159 left causes the table to be indexed to carry a lower die containing molded material to the unloading station and movement of a charged lower die to the upper die. During indexing timer T is reset.

Following indexing, timer T starts and the solenoid L of valve 510 is energized and valve 510 is in the status shown in Fig. 38. Pump P1 is then connected through pipe a, unit 500, pipe b, unit 510, pipe c, unit 520, pipe d, through check valve 532 of unit 530, pipe e connected with the upper end of cylinder 110. The piston 110a moves down and the lower end of cylinder 110 being connected with drain through f and with drain T of unit 510. At the end of down travel of piston 110a, check valve 532 closes. Pump P2 supplies relatively high pressure to pipe e through a pressure control valve 540 a check valve w' and a pipe w connected with pipe e. This high pressure is determined by the setting of the pressure relief valve 540.

When the pressure against the upper side of the piston 110 reaches the maximum, the pressure communicated from e to valve 520 through pipe x will cause the valve 521 to move to the position shown in Fig. 40, thereby connecting c with j so that the pump P1 will be then connected with the lower end of slot cylinder 190 (pump P2 is blocked from d and c by check valve 532 of unit 530) to cause its piston 190a to move up, thereby effecting upward movement of the die compression piston to force molding material into the die cavities.

After the piston 190a of the shot cylinder reaches the top, pressure builds up in pipe k to cause valve 571 of unit 570 to move down into the position shown in Fig. 47 in order to connect pipes m and o. When pedal 575 is depressed to cause valve 581 of unit 580 to move into the position shown in Fig. 49, p is connected with n leading into the lower end of knock-out cylinder 200. Check valve 590 blocks flow from p to z and directly to cylinder 200. Piston 200a rises, the upper end of the piston being connected with drain through m, unit 570 in the status shown in Fig. 47, pipe o and drain pipe T of unit 586 then in the status shown in Fig. 49. When pedal 575 is released, piston 200a goes down because pipe p is connected by unit 580 (as in Fig. 48) to o, to m by unit 570 (as in Fig. 47), to the top of cylinder 200 while the bottom of the cylinder is connected through n and drain T of unit 580 (as in Fig. 48).

The timer T times out and the motor M3 starts and drives the cam shaft which controls the thermoclone and causes it to discharge its contents into an empty die at the loading station. Motor M3 before it shuts itself off, opens switch S2 which causes solenoid L of unit 510 to be deenergized and to return to the status shown in Fig. 37, thereby disconnecting b from c and connecting c with drain T. Pipe b is connected with pipe f, therefore oil flows from pump P1 through pipes f and g. Just then oil cannot flow out from the top of cylinder 110 because check valve 532 of unit 530 will close and the unit 530 is just then in the position shown in Fig. 41 which blocks e from d. Therefore, since h is connected with g through unit 530 then in the status shown in Fig. 44, the shot cylinder piston 190a will move down first since the pressure in moving it down is not built up in y to a value such as to overcome spring 534 of unit 530. The bottom of cylinder 190 is connected with drain T of unit 510 through j, unit 520, c and unit 510. After shot cylinder piston 190a has bottomed on the cylinder, pressure in y builds up to raise valve 531 of unit 530 to the position shown in Fig. 42. The top of cylinder is then connected with drain T of unit 510 through e, unit 530, d, unit 520, c, unit 510 in the status shown in Fig. 37. Therefore piston 110a moves up after piston 190a has moved down. After piston 110a has moved up, pressure in f, g, g' builds up to where unit 560 permits flow through g' to unit 550 to cause its valve 551 to move to the position shown in Fig. 45. Therefore, after piston 110a moves up, h becomes connected with T of unit 550 and there is no pressure above piston 190a as well as no pressure below it. Since l is connected with h, and l with m through unit 570 (in status shown in Fig. 46 since there is no pressure in k, j being connected with drain T of unit 510 through check valve 522 of unit 520, c, and unit 510) there is no pressure above the piston 200a as well as no pressure below it, pressure in p having practically ceased when c becomes connected with T of unit 510. Although the operator should fail to realease pedal 575, the bottom of cylinder 200 can drain through z, check valve 590 and p to c and t of unit 510.

Then there is no pressure on either side of the pistons 190a and 200a. Therefore the spring 195 in the bottom of cylinder 190 is effective to raise its piston 190a slightly to relieve the pressure at the T-slot coupling with the compression piston 178 of the die above it. Also, there is a spring 207 associated with piston 200a of cylinder 200 to relieve the pressure between said piston and a T-slot coupling with the compression piston 178 of the die then above the cylinder 200.

When following the movement of shot cylinder piston 190a down, the pressure in y builds up to such extent as to lift the valve 531 of unit 530, pipe w is connected with d. Therefore the pump P2 can pump to drain through w and to d, valve 520, c and T of valve 510.

When valve 551 is in the position shown in Fig. 45, there is pressure in q to effect movement of the piston 270 to ratchet the reversing valve 260. Return of piston 270a from a right position back to the left position shown in Fig. 34, is effected later when the pressure is applied again to pipe p.

When valve 260 is reversed, the piston 159 in the index cylinder 160 moves left by pressure received from b through u and t; and pipe s is then connected with drain T of unit 600 through the flow control valve 240 which starts to close at about 50% of the index stroke, thereby slowing down the indexing so that the table rack will come to a stop without too much shock against the positive stops which limit its stroke. In shunt with valve 240, there is a relief valve 595 which by-passes a few drops of oil from the exhaust line 599 in order to prevent hydraulic shock.

The wires for the lower die heater units are brought in to a junction box 610 (Fig. 2) and thence down through a flexible conduit 611 which moves with the table 125. A box 612 (Fig. 5) supported by the table is attached to conduit 611 and provides five sockets to which five plugs 614 are connected. To each plug 614 there is connected a two-wire cable 616. Four of the cables 616 are connected with heater units in dies 122 and 123. The other cable 616 is connected with a thermal switch located in die 122. A cross tube 619 (Fig. 12) connects box 612 with box 613 and certain wires in conduit 611 are passed through tube 619 into box 613 when they are connected with five sockets each receiving a plug 615 (Fig. 2). Four of the plugs 615 are connected with two-wire cables 617 connected with heater units in the dies 122 and 123. The other cable 617 is connected with a thermal switch located in die 123. The upper die is provided with four heater units and a thermal switch which are wired in a manner similar to the wiring of the heater units and thermal switches of the lower dies.

A more detailed description of the dies will now be given with reference to Figs. 51-58. Die 121 has a top plate 621 welded to side plates 622 and a center block 623. Plate 621 supports buttons 624. Plates 622 have pins 622a used to support heat insulators around the mold. Screws 625 attach plate 621 to plate 626 which is located by dowel washers 627. Screws 628 attach plate 626 to plate 629 having holes 630 for receiving heater units. Plate 629 receives die blocks 631 backed by blocks 632 in plate 626. The location of blocks 631 and 632 in the plates is fixed by keys 633 and 634 respectively fitting into grooves in the plates and notches in the blocks. For purpose of molding certain parts (ignition distributor-rotor blocks, for example) die blocks 631 provide cavities 635 and supports bushings 637 projecting into the cavities and located relative to the blocks 631 by lugs 638 provided by the bushings. Each block 631 provides channels 639 leading into its cavities. Each bushing 637 may receive a knock-out pin 640 supported by a block 641 attached by screws 642 and dowels 643 to a plate 644.

Die blocks 631 cooperate with die blocks 645 in the upper plate 174 of a lower die (122 or 123). Die blocks 645 are backed by blocks 646 supported by plate 173. Blocks 645 and 646 are located relative to the plates 174 and 173 by keys 647 and 648, respectively, received by notches in the blocks and grooves in the plates. Die blocks 645 have channels 649 leading into the channels 639 of die blocks 631, and holes 650 for receiving metal inserts 651 to be molded into the parts formed in the die cavities. Each hole 650 may receive the upper end 652 of a knock-out rod 296 (Figs. 6 and 7) supported by plate 180 and retained by a plate 179 located by dowels 179a and secured by screws 179b to plate 180.

Cylinder 177 and plate 174 have channel grooves 655 and 656 leading into grooves 649 of die blocks 645. Plate 629 supports a circular block 657 having a central boss 658 in alignment with cylinder 177. Block 659 is attached to block 629 by screws 660. The molding material is forced by piston or cam 178 against block boss 658 and out through the channel grooves 655, 656, 649 and 639 in order to fill the die cavities. The central portion of the flash is squeezed thin between the ram 174 and the boss 658 of block 657. Cylinder 177 is provided with short grooves 177a (Fig. 51) to receive vacuum in cylinder 177 when the ram 178 is pulled down by fluid pressure in the upper end of cylinder 200 (Fig. 6). This prevents vacuum from interfering with the action of springs 207 (Fig. 8) for the purpose described.

Plates 644 and 180 support push-back rods 661 and 662 respectively. Rods 661 are guided by bushings 663 and 665 in plates 626 and 629, respectively. Rods 662 are guided by bushings 664 and 666 in plates 173 and 174 respectively. When the dies are closed, rods 661 and 662 push back on each other so as to locate plate 644 against buttons 624 and plate 180 against buttons 181 and thus withdraw the ends of the knock-out pins from the die cavities. When the upper die begins to move up, springs 121a (Fig. 4) push down on plates 644 to cause the knock-out pins 640 to move into the cavities of the upper die to force the molded parts and connecting flash out of contact with the upper die so that it will gravitate upon the lower die. Thus the molded work is prevented from sticking to the upper die. Springs 121a are located in plate 120 and bushings 121c and 121d supported thereby and push down on pins 121b engaging the plate 644 of the upper die. When the dies are closed, the coacting push-back pins cause the plate 644 to be pushed up and the springs 121a to be further compressed. When a lower die arrives at the unloading station, its plate 180 is raised by the knock-out piston in order to cause the ends of pins 652 to push against the insert 650 and thus to push the work free of the lower die so that an operator may pick up the work and deposit it in a bin.

In order that the dies will be exactly aligned, the block 629 of the upper die 121 is provided with pilot pins 670 having tapered lower ends which passed into the flaring holes in pilot bushings 671 supported by the lower die plates 174 and 173. As each pin moves down within a pilot bushing, it pushes down on a rod 673 guided by a bushing and urged upwardly by a spring 674 located in a recess in the rod and a recess in a block 675 which, like plates 172, is welded to plate 170. When the upper die is separated from a lower die, the upper end of rod 673 moves substantially flush with the top surface of plate 174. At this position, flange 676 engages the pilot bushing 671. As rods 673 move up, they will scrape out any flash which may have gotten into the pilot bushing, and when up they prevent entrance of flash or other foreign matter with the bushings 671.

The machine facilitates the injection molding of thermosetting plastic material, phenolic resins for example, by providing for the preheating of the material in comminuted form as it is customarily received from the supplier. The charge of powdered (comminuted) plastic material is introduced at the top of the thermoclone and the particles fall until they reach a level where the velocity of the hot air upward is sufficient to overcome the force of gravity action on the particles, so that the particles remain suspended, more or less, stationary. This suspension is inherently stable, since a further downward movement of the particles will bring them into a region of greater air velocity thereby forcing them up, while the reverse is true of upward movement of the particles. Substantially uniform heating of all the particles of the charge is rapidly obtained. The temperature to which the particles are heated may depend on the kind of plastic material. Some kinds of thermo-setting phenolic material which requires that the temperatures of the dies be 280° F. to 400° F. should be heated in the thermoclone to about 250° F. to 275° F. For this purpose the temperature of the hot air entering the bottom of the thermoclone may be about 280° F. to 400° F. and its entering velocity about 3600 feet per minute. The duration of the heating cycle will depend on the quantity of the charge to be heated.

While the form of embodiment of the present invention as herein disclosed, constitutes a preferred form, it is to be understood that other forms might be adopted, all coming within the scope of the claims which follow.

What is claimed is as follows:

1. A molding machine having a vertically movable upper die, two lower dies each adapted to cooperate with the upper die for a molding operation and each providing, in conjunction with the upper die, when engaged thereby, a mold cavity, a compression chamber and a channel connecting the chamber with the cavity, rams each operating in a compression chamber, provisions for heating the dies, means for positioning a lower die loaded with molding material at a curing station under the upper die while positioning the other lower die at a loading station and for reversing positions of the lower dies after a curing cycle, means for moving the upper die against the lower die at the curing station, means for operating the ram of the lower die at the curing station to compress the material therein to force it through the channel into the cavity while the upper die is maintained against the die below it during the curing cycle, means operating during a curing cycle for heating the material to be molded while in comminuted form and delivering it while in said form to the lower die at the loading station, and apparatus for operating all of said means in timed relation.

2. A molding machine having a vertically movable upper die, two lower dies each adapted to cooperate with the upper die for a molding operation and each providing, in conjunction with the upper die, when engaged thereby, a mold cavity, a compression chamber and a channel connecting the chamber with the cavity, rams each operating in a compression chamber, provisions for heating the dies, means for positioning a lower die loaded with molding material at a curing station under the upper die while positioning the other lower die at a loading station and for reversing positions of the lower dies after a curing cycle, means for moving the upper die against the lower die at the curing station, means for operating the ram of the lower die at the curing station to compress the material therein to force it through the channel into the cavity while the upper die is maintained against the die below it during the curing cycle, means operating during a curing cycle for heating the material to be molded while in comminuted form and delivering it while in said form to the lower die at the loading station, ejecting means provided by each lower die and caused to function by movement of the ram of the lower die, means for operating the ram of a lower die when at the loading station a distance sufficient to effect loosening of the molded part from the lower die cavity by said ejecting means to facilitate removal of the work preparatory to charging the loading die with molding material, and apparatus for operating all of said means in timed relation.

3. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing mold cavities, each conveyor-positioned die having a compression cylinder communicating with the mold cavities and having a ram in the cylinder movable toward the third die to force the material in the cylinder into the mold cavities, means for moving the third die, means for moving the ram of the die at the molding station, means for heating the dies, control apparatus for the third die moving means and the ram moving means and conditionable to cause the third die to engage a conveyor-supported die and then the ram of the latter die to move toward the third die and conditionable to cause the ram to separate from the third die and the third die to separate from the conveyor-supported die, a timer for determining the duration of cure, means responsive to the timer for causing the control apparatus to be conditioned as second mentioned, means responsive to said separation of the third die for causing operation of the conveyor indexing means, means under control of indexing movement for causing the timer to be rest and means responsive to completion of indexing for causing the control apparatus to be conditioned as first mentioned and for causing the timer to start timing.

4. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing mold cavities, each conveyor-positioned die having a compression cylinder communicating with the mold cavities and having a ram in the cylinder movable toward the third die to force the material in the cylinder into the mold cavities, means for moving the third die, means for moving the ram of the die at the molding station, means for heating the dies, control apparatus for the third die moving means and the ram moving means and conditionable to cause the third die to engage a conveyor-supported die and then the ram of the latter die to move toward the third die and conditionable to cause the ram to separate from the third die and the third die to separate from the conveyor-supported die, a timer for determining the duration of cure, means responsive to operation of the timer for causing the delivery of a charge of molding material to the die at the loading station, means responsive to the timer for causing the control apparatus to be conditioned as second mentioned, means responsive to said separation of the third die for causing operation of the conveyor indexing means, means under control by indexing movement for causing the timer to be reset and means responsive to completion of indexing for causing the control apparatus to be conditioned as first mentioned and for causing the timer to start timing.

5. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing mold cavities, each conveyor-positioned die having a compression cylinder communicating with the mold cavities and having a ram in the cylinder movable toward the third die to force the material in the cylinder into the mold cavities, means for moving the third die, means for moving the ram of the die at the molding station, means for heating the dies, control apparatus for the third die moving means and the ram moving means and conditionable to cause the third die to engage a conveyor-supported die and then the ram of the latter die to move toward the third die and conditionable to cause the ram to separate from the third die and the third die to separate from the conveyor-supported die, a timer for determining the duration of cure, means responsive to the operation of the timer for causing the delivery of a measured charge of molding material to the die at the loading station and the measuring of a new charge, means responsive to the timer for causing the control apparatus to be conditioned as second mentioned, means responsive to said separation of the third die for causing operation of the conveyor indexing means, means under control by indexing movement for causing the timer to be reset and means responsive to completion of indexing for causing the control apparatus to be conditioned as first mentioned and for causing the timer to start timing.

6. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing mold cavities, each conveyor-positioned die having a compression cylinder communicating with the mold cavities and having a ram in the cylinder movable toward the third die to force the material in the cylinder into the mold cavities, means for moving the third die, means for moving the ram of the die at the molding station, means for heating the dies, control apparatus for the third die moving means and the ram moving means and conditionable to cause the third die to engage a conveyor-supported die and then the ram of the latter die to move toward the third die and conditionable to cause the ram to separate from the third die and the third die to separate from the conveyor-supported die, a timer for determining the duration of cure, means responsive to the operation of the timer for causing a charge of material to be heated and then delivered to the die at the loading station. means responsive to the timer for causing the control apparatus to be conditioned as second mentioned, means responsive to said separation of the third die for causing operation of the conveyor indexing means, means under control by indexing movement for causing the timer to be reset and means responsive to completion of indexing for causing the control apparatus to be conditioned as first mentioned and for causing the timer to start timing.

7. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing mold cavities, each conveyor-positioned die having a compression cylinder communicating with the mold cavities and having a ram in the cylinder movable toward the third die to force the material in the cylinder into the mold cavities, means for moving the third die, means for moving the ram of the die at the molding station, means for heating the dies, control apparatus for the third die moving means and the ram moving means and conditionable to cause the third die to engage a conveyor-supported die and then the ram of the latter die to move toward the third die and conditionable to cause the ram to separate from the third die and the third die to separate from the conveyor-supported die, a timer for determining the duration of cure, means responsive to the operation of the timer for causing a charge of material to be heated and then delivered to the die at the loading station, and the measuring of a new charge, means responsive to the timer for causing the control apparatus to be conditioned as second mentioned, means responsive to said separation of the third die for causing operation of the conveyor indexing means, means under control by indexing movement for causing the timer to be reset and means responsive to completion of indexing for causing the control apparatus to be conditioned as first mentioned and for causing the timer to start timing.

8. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing a mold cavity, means for heating the dies, means for moving the third die against or away from a conveyor-positioned die, control apparatus for said die moving means including an electromagnet, control apparatus for said indexing means operable to effect an indexing movement in response to separation of the third die from a conveyor-positioned die, a timer for determining the duration of cure, means under control by the timer for conditioning the electromagnet for causing the control apparatus associated therewith to effect retraction of the third die in consequence of which indexing takes place, means under control by operation of the indexing means for causing the timer to be reset, and means responsive to completion of indexing for causing the timer to start timing and for conditioning the electromagnet for causing the control apparatus associated therewith to effect engagement of the third die with a conveyor-positioned die.

9. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing a mold cavity, means for heating the dies, means for moving the third die against or away from a conveyor-positioned die, control apparatus for said die moving means including an electromagnet, control apparatus for said indexing means operable to effect an indexing movement in response to separation of the third die from a conveyor-positioned die, material handling apparatus including a device for preheating a charge of material and a device for delivering the preheated material to a die at the loading station, a timer for determining the duration of cure, means under control by the timer for effecting operation of said devices of the material handling apparatus and for conditioning the electromagnet for causing the control apparatus associated therewith to effect retraction of the third die in consequence of which indexing takes place, means under control by operation of the indexing means for causing the timer to be reset, and means responsive to completion of indexing for causing the timer to start timing and for conditioning the electromagnet for causing the control apparatus associated therewith to effect engagement of the third die with a conveyor-positioned die.

10. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing a mold cavity, means for heating the dies, means for moving the third die against or away from a conveyor-positioned die, control apparatus for said die moving means including an electromagnet, control apparatus for said indexing means operable to effect an indexing movement in response to separation of the third die from a conveyor-positioned die, material handling apparatus including a device for preheating a charge of material and a device for delivering the preheated material to a die at the loading station, a timer for determining the duration of cure, an electric motor under control by the timer and means operated thereby respectively for effecting operation of the devices of the material handling apparatus and for conditioning the electromagnet for causing the control apparatus associated therewith to effect retraction of the third die in consequence of which indexing takes place, means under control by operation of the indexing means for causing the timer to be reset, and means responsive to completion of indexing for causing the timer to start timing and for conditioning the electromagnet for causing the control apparatus associated therewith to effect engagement of the third die with a conveyor-positioned die.

11. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing a mold cavity, means for heating the dies, means for moving the third die against or away from a conveyor-positioned die, control apparatus for said die moving means including an electromagnet, the energization of which causes the third die to engage a conveyor-positioned die and the deenergization of which causes the third die to separate from the conveyor-positioned die, control apparatus for said indexing means operable to effect an indexing movement in response to separation of the third die from a conveyor-positioned die, a current source, a relay switch having a relay magnet coil and operable, in response to connecting the relay coil with the current source, for connecting the current source with the first mentioned electromagnet, a timer for determining the duration of cure, a control circuit for the relay magnet coil for connecting it with the current source, means responsive to "timing-out" by the timer for effecting, after a time interval, the interruption of the circuit whereby the first electromagnet is deenergized in consequence of which the third die retracts and indexing is effected, means for causing the timer to be reset during indexing, means rendered operative in response to the completion of indexing for effecting completion of the relay magnet coil control circuit whereby the first electromagnet is reenergized and means responding to completion of indexing for causing the timer to start timing.

12. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing a mold cavity, means for heating the dies, means for moving the third die against or away from a conveyor-positioned die, control apparatus for said die moving means including an electromagnet, the energization of which causes the third die to engage a conveyor-positioned die and the deenergization of which causes the third die to separate from the conveyor-positioned die, control apparatus for said indexing means operable to effect an indexing movement in response to separation of the third die from a conveyor-positioned die, a current source, a relay switch having a relay magnet coil and operable, in response to connecting the relay coil with the current source, for connecting the current source with the first mentioned electromagnet, a timer for determining the duration of cure, a control circuit for the relay magnet coil for connecting it with the current source and having parallel circuits, one circuit of which includes a first switch closed by said relay when its coil is energized and a second switch in series with the first switch, the other of said parallel circuits including a third switch, said parallel circuits being together in series with the relay magnet coil and a fourth switch, the first switch being a part of said relay when its magnet coil is energized, the second switch being normally closed, the third switch being biased closed during curing and the fourth switch being normally biased open, means which holds the fourth switch closed while the conveyor is stationary, a timer for determining the duration of cure, means responsive to "timing-out" by the timer for opening the third switch and for causing, after a time interval, the opening of the second switch whereby the first electromagnet is deenergized in consequence of which the third die retracts and indexing is effected, means for causing the timer to be reset during indexing, said third switch returning to closed condition when the timer is reset, said fourth switch opening during indexing and closing upon completion of indexing whereby the relay magnet coil is reenergized in consequence of which the first electromagnet is reenergized and means responding to the completion of indexing for causing the timer to start timing.

13. A molding machine comprising a conveyor, two dies positioned thereby, indexing means for moving the conveyor to locate one of the dies at a loading station and the other at a molding station, a third die movable to engage a conveyor-positioned die at the molding station, the engaging dies providing a mold cavity, means for heating the dies, means for moving the third die against or away from a conveyor-positioned die, control apparatus for said die moving means including an electromagnet, the energization of which causes the third die to engage a conveyor-positioned die and the deenergization of which causes the third die to separate from the conveyor-positioned die, control apparatus for said indexing means operable to effect an indexing movement in response to separation of the third die from a conveyor-positioned die, a current source, a relay switch having a relay magnet coil and operable, in response to connecting the relay coil with the current source, for connecting the current source with the first mentioned electromagnet, a timer for determining the duration of cure, a control circuit for the relay magnet coil for connecting it with the current source and having parallel circuits, one circuit of which includes a first switch closed by said relay when its coil is energized and a second switch in series with the first switch, the other of said parallel circuits including a third switch, said parallel circuits being together in series with the relay magnet coil and a fourth switch, the first switch being a part of said relay when its magnet coil is energized, the second switch being normally closed, the third switch having two contact making positions, namely, a first position in which it is biased to close said parallel circuit and a second position in which remains in series with the fourth switch, said fourth switch having two circuit making positions, namely, a first position in which will be in series with said parallel circuits with the third switch in its first mentioned position, and second position not in series with said parallel circuits, a timer having a servo motor, a shaft operated thereby, a spring resisting rotation of the shaft during the timing, a friction clutch connecting the servo motor and shaft, an electromagnet for disengaging the clutch, a spring for reengaging the clutch, and means operated by said shaft for moving the third switch to its second position when the timer "times-out," means rendered operative by actuation of the third switch to its second position for causing the second switch to be opened momentarily after a time interval whereby the first mentioned electromagnet is deenergized in consequence of which the third die retracts and indexing is effected, the movement of the fourth switch to its second position during indexing causing the timer electromagnet to be energized whereby the timer shaft is disengaged from the timer servo motor in consequence of which the first spring of the timer returns the timer shaft to starting position and the third switch returns to its first position, the completion of indexing causing the fourth switch to disconnect the timer electromagnet from the current source in consequence of which the second spring of the timer reconnects the timer clutch and the timer shaft starts movement from starting position, and causing the fourth switch to move to its first position whereby the circuit of the relay magnet coil is again completed and the first mentioned electromagnet is reenergized.

14. A molding machine according to claim 13 in which the means rendered operative by actuation of the third switch to its second position comprises an electric motor and means operated thereby for opening the second switch momentarily at a certain time after the motor starts, the operating circuit of said motor being under control by a fifth switch which is shunted by a series circuit comprising the third switch in its second position and the fourth switch in its first position, the fifth switch maintaining the motor in operation after indexing starts and until the motor opens the fifth switch by means operated by the motor.

15. An electrical control apparatus for a molding machine having two dies positioned by a conveyor alternately at loading and molding stations and a third die for engaging a conveyor-positioned die at the molding station and having means responsive to the energization and deenergization of an electromagnet for causing, respectively, the third die to move toward and away from a conveyor-positioned die and having means for indexing the conveyor while the third die is separated from a conveyor-positioned die, said apparatus comprising the following circuits connected with a current source: (a) a circuit comprising the machine-controlling electromagnet and a relay switch, (b) a circuit comprising the magnet coil of said relay switch in series with two parallel circuits, one branch of which includes a first and a second switch in series and the other branch of which includes a third switch, and a fourth switch in series with the parallel circuits and the relay coil, (c) a circuit comprising an electric motor and a second relay switch, (d) a circuit comprising the magnet coil of the second relay switch in series with two parallel circuits, one branch of which includes a fifth switch controlled by the electric motor and the other of which includes the third and fourth switches when in certain positions and (e) an electromagnet and the fourth switch when in a certain position, a cure timer, the first switch being a part of the first relay switch and closed by the energization of the magnet coil of said relay, the second switch being opened by the electric motor, means operated by the timer when "timed-out" for moving said third switch from circuit closing position in circuit -b- to circuit closing position in circuit -d-, said third switch returning to circuit -b- when the timer is reset, means responsive to completion of indexing for maintaining the fourth switch closed in circuits -b- or -d-, said fourth switch moving to open circuit -b- and to close circuit -e- during indexing whereby the electromagnet in circuit -e- is energized during indexing, and means provided by the timer for causing the timer to be reset when said electromagnet is energized and the timer to start timing again when said electromagnet is deenergized.

16. An electrical control apparatus for a molding machine having two dies positioned by a conveyor alternately at loading and molding stations and a third die for engaging a conveyor-positioned die at the molding station and having means responsive to the energization and deenergization of an electromagnet for causing, respectively, the third die to move toward and away from a conveyor-positioned die and having means for indexing the conveyor while the third die is separated from a conveyor-positioned die, said apparatus comprising a cure timer, an electric circuit which is connected with a current source in response to "timing-out" by the timer, a device set into operation by the establishment of said circuit and means operated thereby for causing the electromagnet of said apparatus to be deenergized a certain time after said circuit is established, a second circuit which is connected with a current source during indexing and including means for causing the timer to be reset, a third circuit which is connected with a current source in response to resetting the timer and to completion of indexing and including means for causing said electromagnet to be energized, and means for causing the timer to start timing in response to interruption of the second circuit by the completion of indexing.

17. Apparatus according to claim 16 in which the device is an electric motor and in which there is a switch which the motor operates a certain time after the motor starts for the purpose of deenergizing the electromagnet of the machine, in which the resetting of the timer causes the first circuit to be broken, and in which a fourth circuit, established after the motor starts and before the timer is reset, maintains operation of the motor independently of the first circuit, said fourth circuit including a switch which is opened by the motor at the end of its cycle.

18. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, hydraulic means for moving the third die toward and away from the conveyor-positioned die at the molding station, hydraulic means for moving the ram of the die last mentioned toward and away from the third die, hydraulic means for indexing the conveyor, a valve for controlling the first and second hydraulic means, a valve for controlling the third hydraulic means automatically to effect indexing after the ram and the third die have been retracted and means for operating the first valve.

19. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, hydraulic means for moving the third die toward and away from the conveyor-positioned die at the molding station, hydraulic means for moving the ram of the die last mentioned toward and away from the third die, hydraulic means for indexing the conveyor, a valve for controlling the first and second hydraulic means, a valve for controlling the third hydraulic means automatically to effect indexing after the ram and the third die have been retracted, a cure timer, and means under control by the cure timer to position the first valve for retraction of the ram and third die and responsive to completion of indexing to position the first valve for advancement of the third die and ram.

20. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, hydraulic means for moving the third die toward and away from the conveyor-positioned die at the molding station, hydraulic means for moving the ram of the die last mentioned toward and away from the third die, hydraulic means for indexing the conveyor, hydraulic means for ejecting molded work from the die at the loading station, a valve for controlling the third hydraulic means automatically to effect indexing after the ram and the third die have been retracted, means for operating the first valve, a manually operated valve for controlling the fourth hydraulic means, and means for withholding the passage of pressure fluid from the manually operated valve to the fourth hydraulic means to cause it to eject the work until after the third die and ram have been advanced.

21. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, hydraulic means for moving the third die toward and away from the conveyor-positioned die at the molding station, hydraulic means for moving the ram of the die last mentioned toward and away from the third die, hydraulic means for indexing the conveyor, hydraulic means for ejecting molded work from the die at the loading station, a valve for controlling the first and second hydraulic means, a valve for controlling the third hydraulic means automatically to effect indexing after the ram and the third die have been retracted, a cure timer, means under control by the cure timer to position the first valve for retraction of the ram and the third die and responsive to completion of indexing to position the first valve for advancement of the third die and ram, and means for withholding the passage of pressure fluid from the manually operated valve to the fourth hydraulic means to cause it to eject the work until after indexing has been completed.

22. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, hydraulic means for moving the third die toward and away from the conveyor-positioned die at the molding station, hydraulic means for moving the ram of the die last mentioned toward and away from the third die, hydraulic means for indexing the conveyor, hydraulic means for ejecting molded work from the die at the loading station, a valve for controlling the third hydraulic means automatically to effect indexing after the ram and the third die have been retracted, means for operating the first valve, a manually operated valve for controlling the fourth hydraulic means, means for withholding the passage of pressure fluid from the manually operated valve to the fourth hydraulic means to cause it to eject the work until after the third die and ram have been advanced, and provisions rendered operative in response to operation of the first valve to cause retraction of the ram and third die for causing the fourth hydraulic means to return to normal status independently of control by the manually operated valve.

23. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, hydraulic means for moving the third die toward and away from the conveyor-positioned die at the molding station, hydraulic means for moving the ram of the die last mentioned, toward and away from the third die, hydraulic means for indexing the conveyor, hydraulic means for ejecting molded work from the die at the loading station, a valve for controlling the first and second hydraulic means, a valve for controlling the third hydraulic means automatically to effect indexing after the ram and the third die have been retracted, a cure timer, means under control by the cure timer to position the first valve for retraction of the ram and the third die and responsive to completion of indexing to position the first valve for advancement of the third die and ram, means for withholding the passage of pressure fluid from the manually operated valve to the fourth hydraulic means to cause it to eject the work until after indexing has been completed, and provisions rendered operative in response to operation of the first valve to cause retraction of the ram and third die for causing the fourth hydraulic means to return to normal status independently of control by the manually operated valve.

24. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities, said rams having coupling members and the ram piston having a coupler adapted to engage the ram coupler whereby, at the end of each indexing operation, the ram piston is coupled to a ram, hydraulic means for moving the third die toward and away from the conveyor-positioned die at the molding station, hydraulic means for moving the ram of the die last mentioned toward and away from the third die, hydraulic means for indexing the conveyor, a valve for controlling the first and second hydraulic means, means for operating said valve and means operating automatically in response to retraction of the ram and third die for causing relief of pressure from the second hydraulic means, whereby mechanical pressure at the coupling members is relieved, and for causing operation of the hydraulically operated indexing means.

25. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities and having work ejection means operated by movement of the ram when the die is at the loading station, said rams having coupling members and the ram piston and the ejection piston each having a coupler adapted to engage the ram coupler whereby, after each indexing of the conveyor, the ram piston is coupled with a ram and the ejection piston is connected with a ram, hydraulic means for moving the third die toward and away from the conveyor-positioned die at the molding station, hydraulic means for moving the ram of the die last mentioned toward and away from the third die, hydraulic means for indexing the conveyor, hydraulic means for operating the ram of the die at the loading station, a valve for controlling the first and second hydraulic means, means for operating said valve and means operating automatically in response to retraction of the ram and third die for causing relief of pressure from the second and fourth hydraulic means, whereby mechanical pressure at the coupling members is relieved, and for causing operation of the hydraulically operated indexing means.

26. A molding press having a conveyor, two dies positioned thereby, one at a loading station and the other at a molding station, a third die movable to engage the conveyor-positioned die at the molding station, each conveyor-positioned die having an injection cylinder and a ram therein for forcing molding material into die cavities and having work ejection means operated by movement of the ram when the die is at the loading station, a clamp cylinder and piston therein for moving the third die, a ram cylinder and piston therein for moving the ram of the conveyor-positioned die at the molding station, an ejection cylinder and piston therein for moving the ram of the conveyor-positioned die at the loading station sufficiently to operate the work ejecting means, said rams having coupling members and the ram piston and the ejection piston each having a coupler adapted to engage the ram coupler whereby, after each indexing of the conveyor, the ram piston is coupled with a ram and the ejection piston is connected with a ram, the ends of the cylinders nearest the dies being designated hereafter as the adjacent ends and the other ends of the cylinders, the remote ends, a pressure fluid source, a first valve for connecting the source with the remote ends of the clamp and ram cylinders and the adjacent ends with drain and vice versa, a second valve for withholding pressure for the remote end of the ram cylinder until after the third die engages a conveyor-positioned die, a third valve which withholds draining of the remote end of the clamp cylinder until after the ram piston has fully retracted from the third die, a fourth valve normally making a connection between the duct leading to the adjacent end of the clamp cylinder and the duct leading to the adjacent end of the ram cylinder, and operating in response to full retraction of the clamp piston for connecting the second mentioned duct with drain, a duct connected with the second mentioned duct, a fifth valve normally making connection between the third mentioned duct and a fourth duct leading into the adjacent end of the ejection cylinder and responsive to complete advancement of the ram piston for disconnecting the fourth duct from the third duct and for connecting the fourth duct with a fifth duct, a sixth valve for making connection between a sixth duct connected with the line from the first valve to the remote end of the clamp cylinder and either directly to the remote end of the ejection cylinder or through the fifth and fourth ducts (when connected by the fifth valve) to the adjacent end of the ejection cylinder, and a seventh duct and a check valve connecting the remote end of the ejection cylinder with the sixth duct whereby said cylinder end is connected with drain when the first valve makes connection for draining the remote end of the clamp cylinder, the ejection piston being retracted by pressure thereon when the fourth and fifth valves are in normal status, means responsive to operation of the fourth valve from normal status (responsive to full retraction of the clamp piston) for causing the conveyor to be indexed, a cure timer, and means under control by the timer for causing the first valve to operate to effect retraction of the ram and clamp pistons and responsive to completion of indexing for causing the first valve to operate to effect advancement of the clamp and ram pistons.

27. A molding press according to claim 26 having conveyor indexing means operated by an hydraulic servo motor controlled by a pressure fluid distributing valve operated by means actuated in response to operation of the fourth valve from normal status in response to full retraction of the clamp piston.

CHARLES A. NICHOLS.
RUSSELL B. BOWER.
JAMES R. EDWARDS.
WILLIAM A. FLETCHER.
HAROLD W. McCOY.
BASIL S. SAMPLE.
GEORGE L. WEISER.

REFERENCES CITED

The following references are of record in the file of this patent:

UNITED STATES PATENTS

| Number | Name | Date |
| --- | --- | --- |
| 859,640 | Bright | July 9, 1907 |
| 2,249,964 | Lindner | July 22, 1941 |
| 2,330,545 | Benoit | Sept. 28, 1943 |
| 2,333,056 | Thoreson et al. | Oct. 26, 1943 |
| 2,333,059 | Tucker | Oct. 26, 1943 |
| 2,351,774 | McGowen | June 20, 1944 |
| 2,359,013 | Tucker | Sept. 22, 1944 |
| 2,410,909 | Tucker | Nov. 12, 1946 |
| 2,420,405 | Alves | May 13, 1947 |

FOREIGN PATENTS

| Number | Country | Date |
| --- | --- | --- |
| 851,723 | France | Jan. 13, 1940 |